United States Patent [19]
Pender

[11] 3,762,667

[45] Oct. 2, 1973

[54] VERTICAL TAKE-OFF AND LANDING AIRCRAFT

[76] Inventor: David R. Pender, 1018 Marion St., Columbia, S.C. 29201

[22] Filed: Dec. 29, 1971

[21] Appl. No.: 213,245

[52] U.S. Cl. .............................. 244/7 A, 244/17.19
[51] Int. Cl. ............................................ B64c 27/22
[58] Field of Search ................ 244/7 A, 2, 6, 17.19, 244/13, 58, 139, 140

[56] References Cited
UNITED STATES PATENTS

| | | | |
|---|---|---|---|
| 3,582,021 | 6/1971 | Pander................................ | 244/7 A |
| 2,629,570 | 2/1953 | Carnahan............................ | 244/7 R |
| 3,119,577 | 1/1964 | Andrews............................. | 244/7 R |
| 3,185,408 | 5/1965 | Higgins................................ | 244/7 R |

Primary Examiner—Milton Buchler
Assistant Examiner—Carl A. Rutledge
Attorney—B. P. Fishburne, Jr.

[57] ABSTRACT

A VTOL aircraft is powered on regular fixed wing flight by a pair of jet engines on the after quarter of the fuselage and achieves vertical take-off and landing under the power of an articulated tail rotor which is retractable into a storage compartment of the fuselage during conversion from rotor flight to fixed wing flight. The take-off and landing rotor derives power for its blade tip jet nozzles through internal ducting which receives jet engine exhaust gas through a diversion system connected in the main jet exhaust nozzle of each engine. By-pass air is also diverted from each engine to the interior of the rotor blades and is further directed to rotor blade jet flap slots for maintaining rotor cyclic and collective pitch control without the customary complex mechanisms. Rotor directional control is maintained by diverting additional by-pass air to certain fixed wing jet flap slots. A mechanical traction device is utilized to retract and extend the rotor.

31 Claims, 41 Drawing Figures

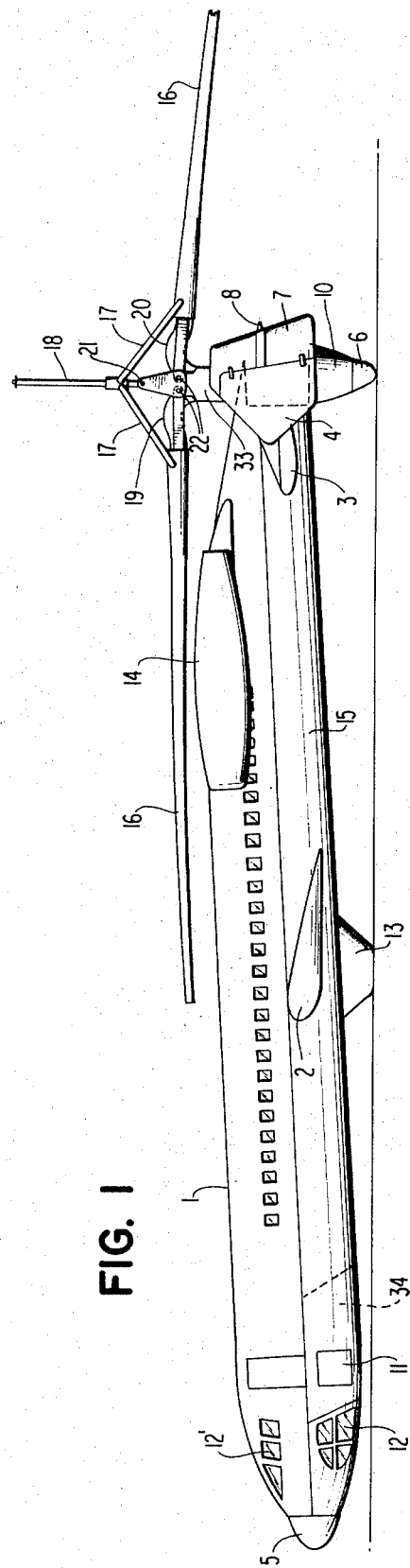
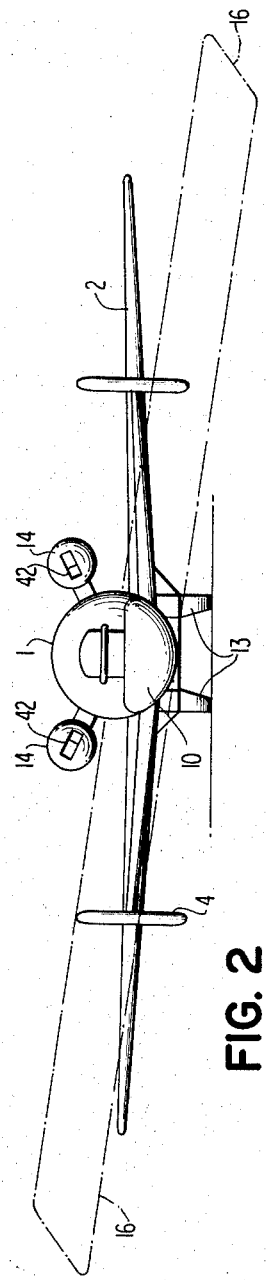
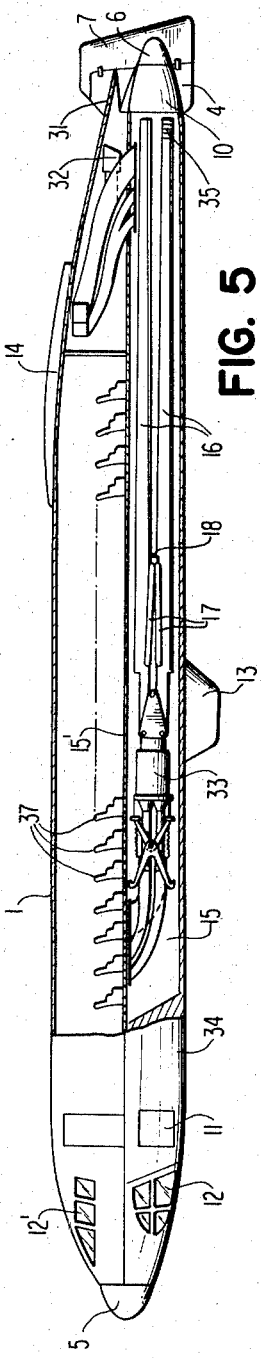
FIG. 1
FIG. 2
FIG. 5
INVENTOR
David R. Pender
BY B. P. Fishburn, Jr.
ATTORNEY

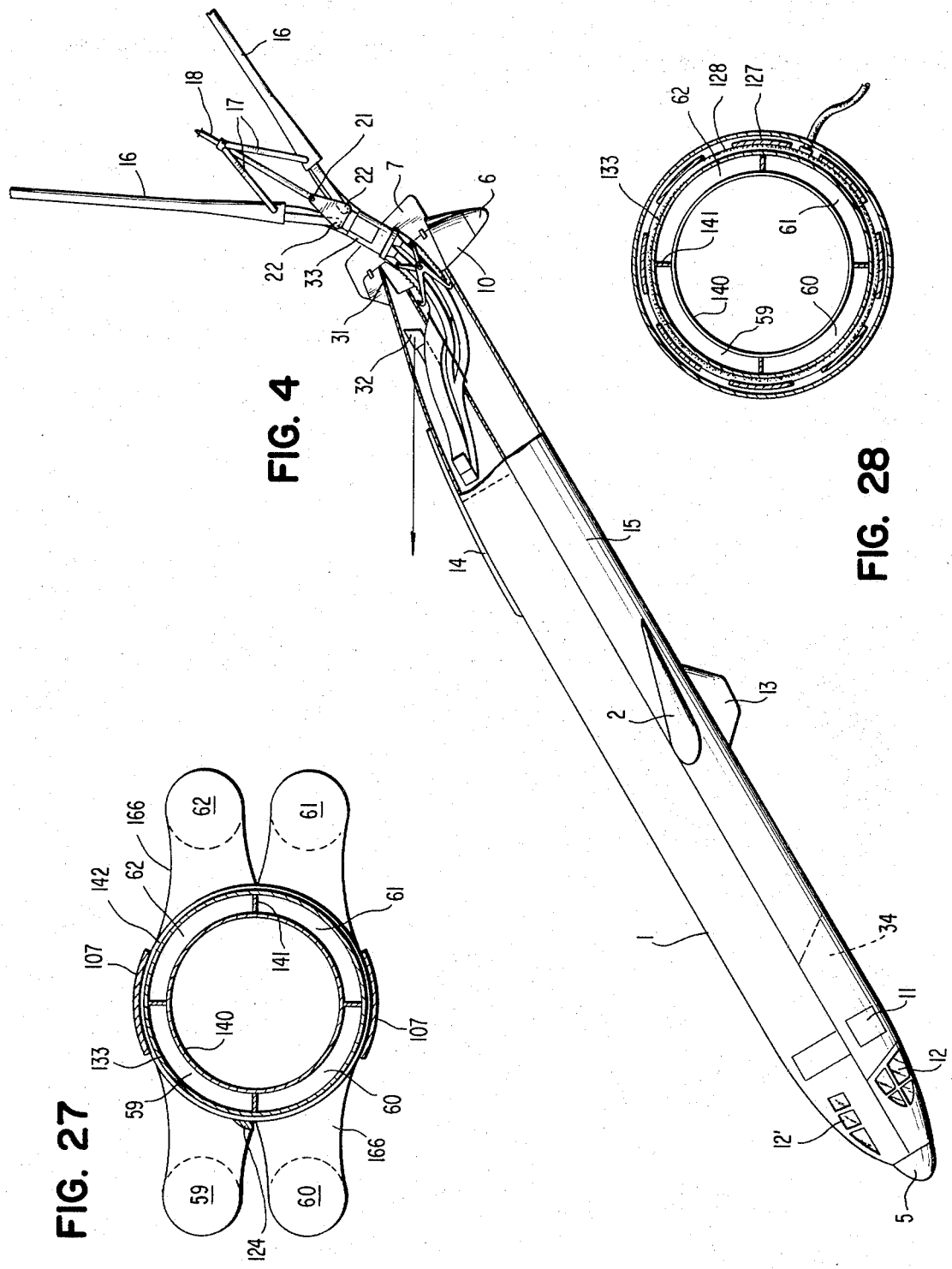

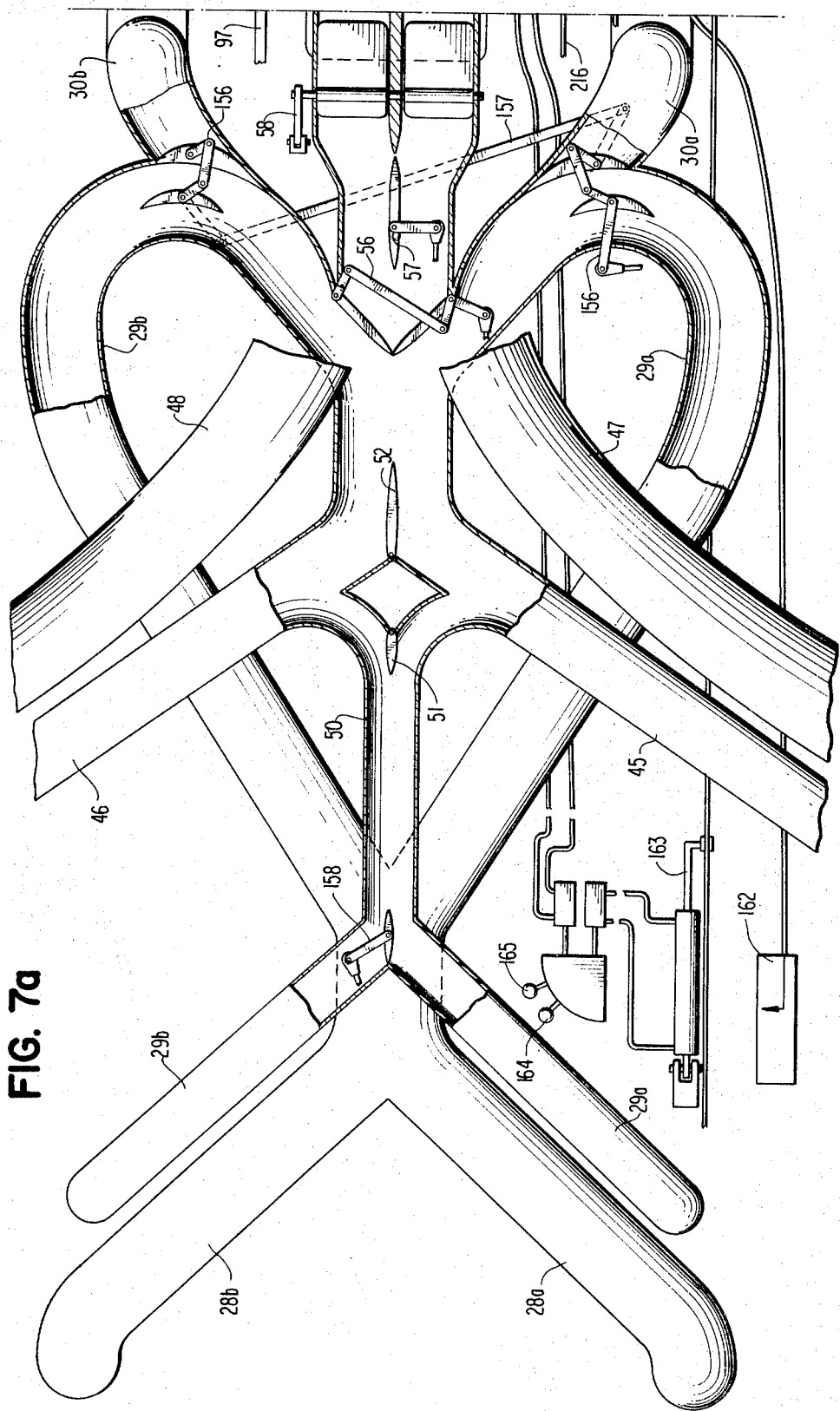

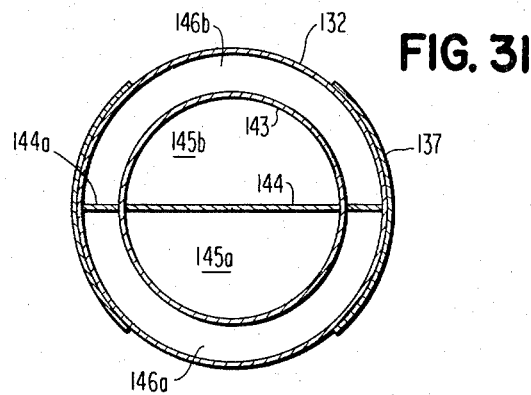
FIG. 31
FIG. 8a
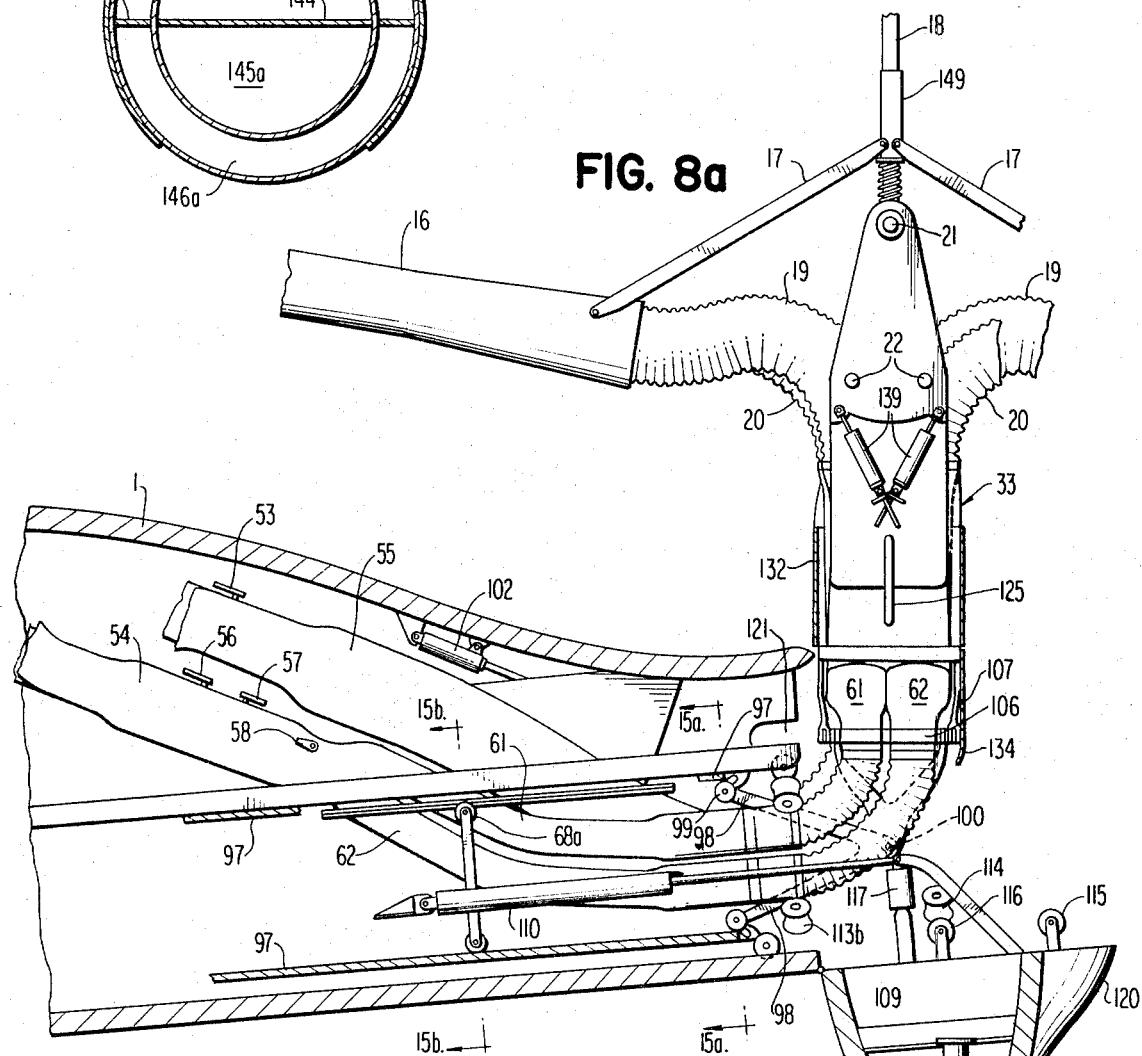
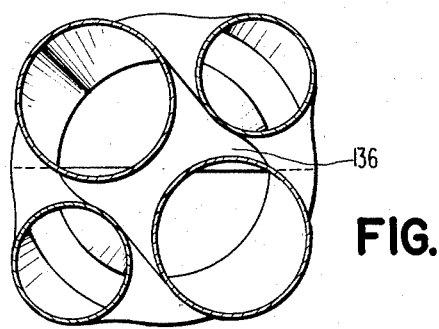
FIG. 32

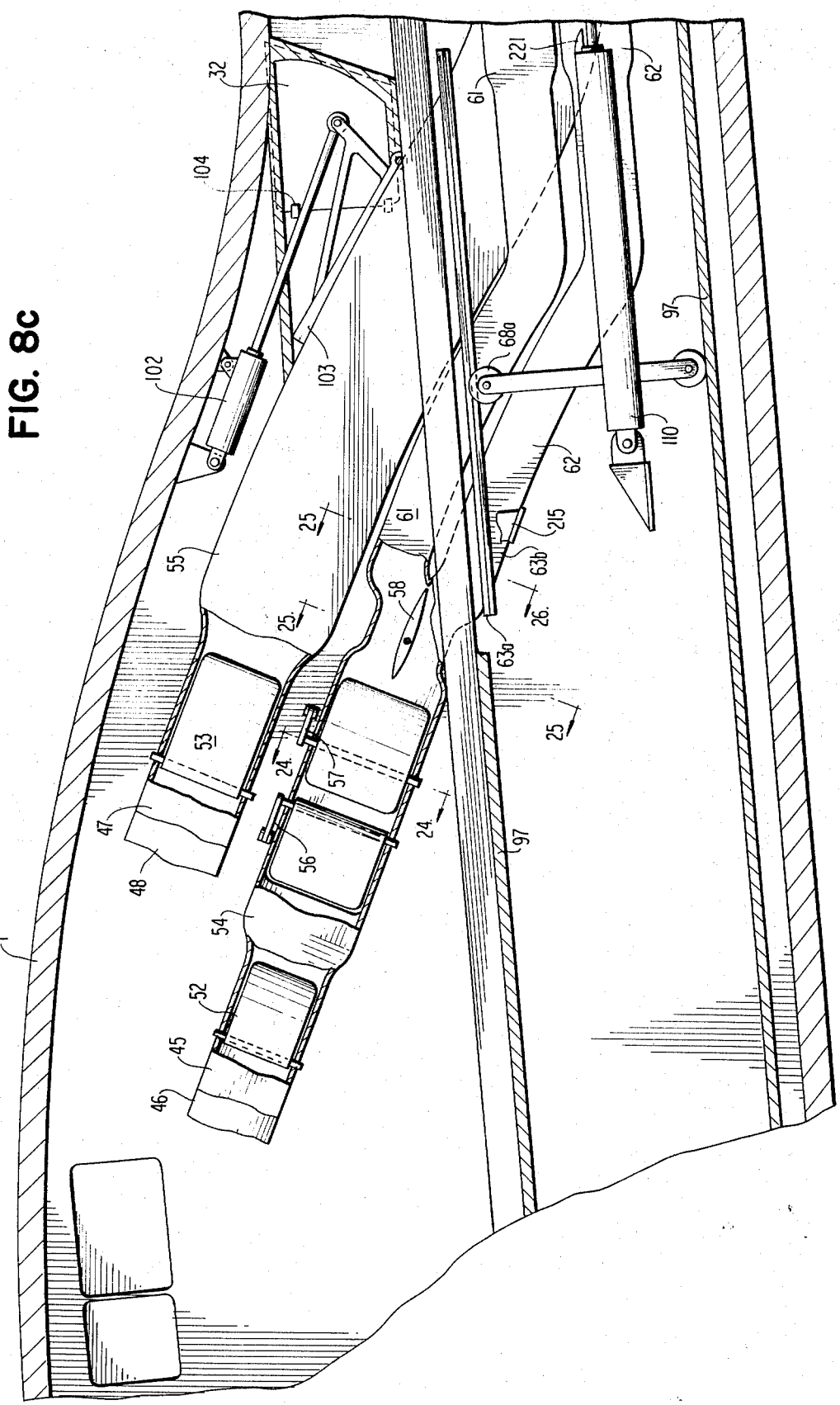

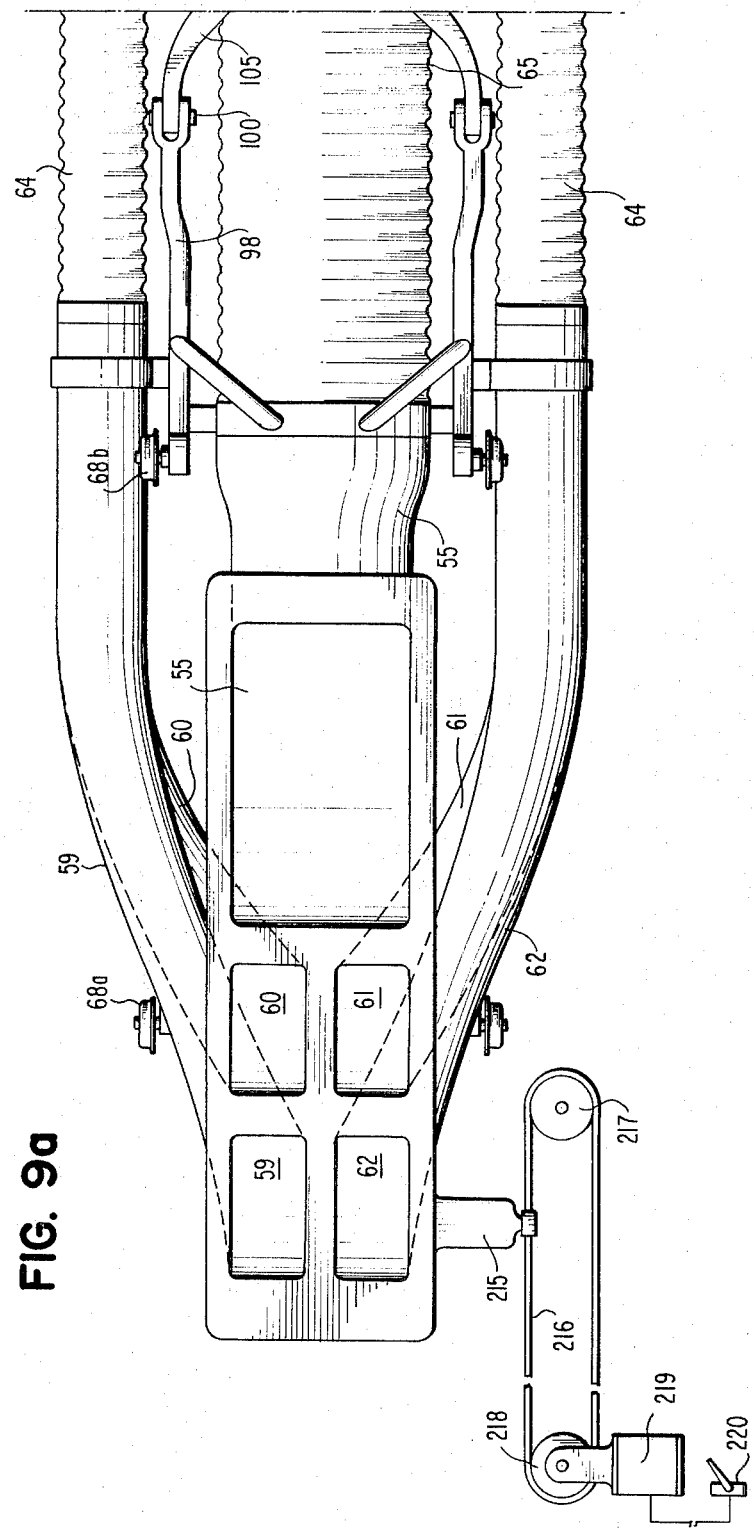

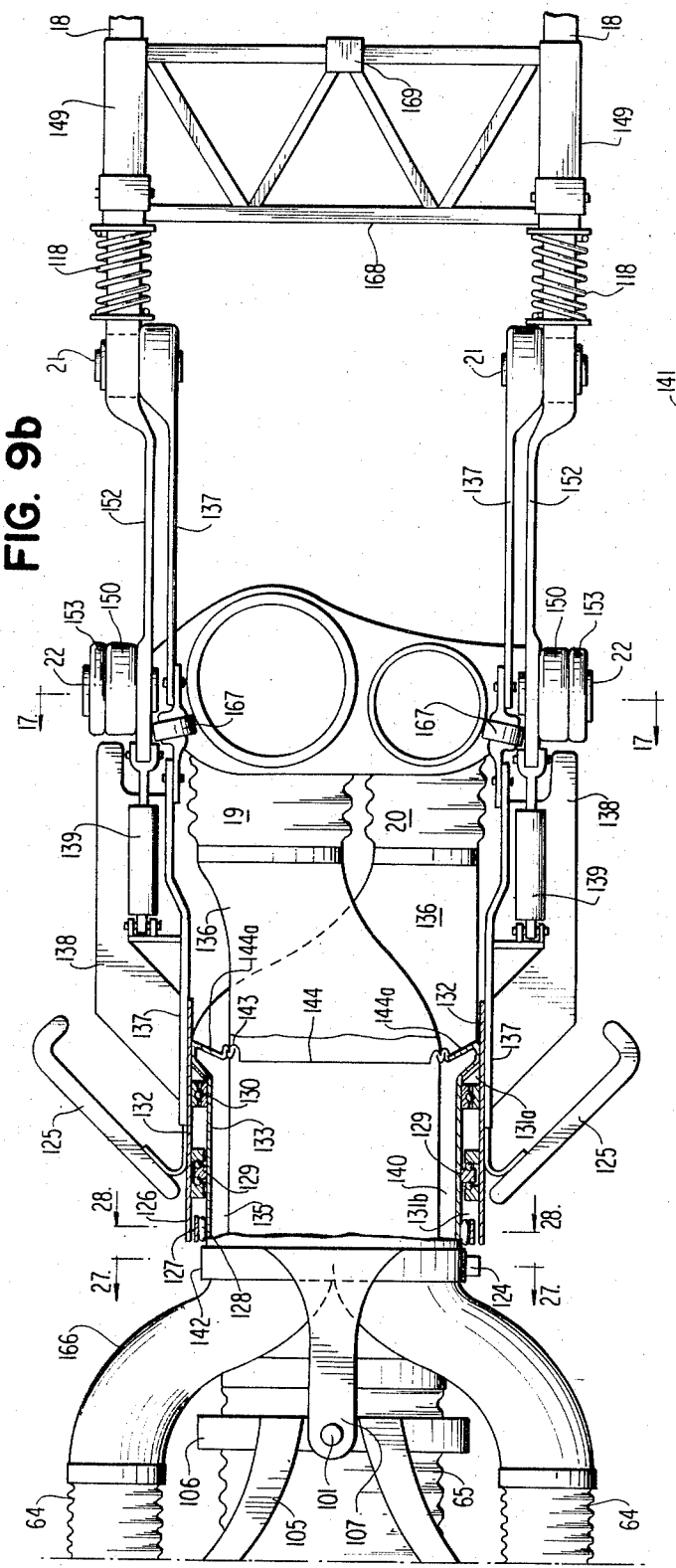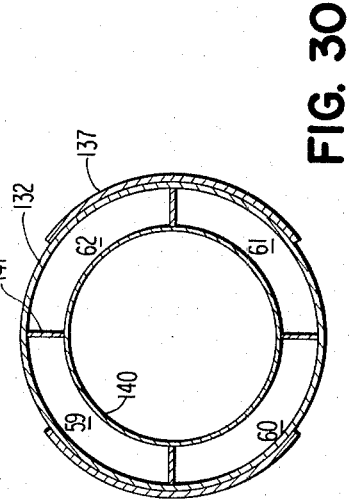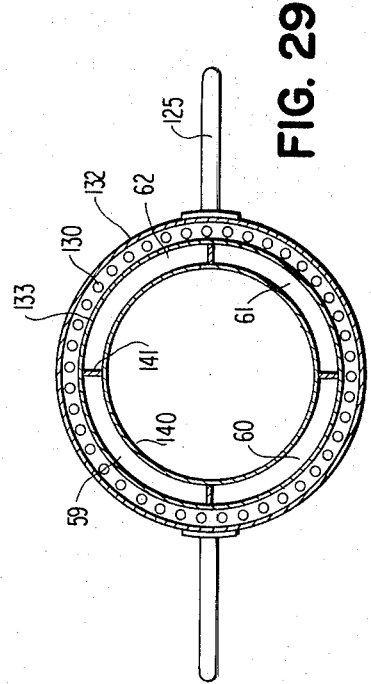

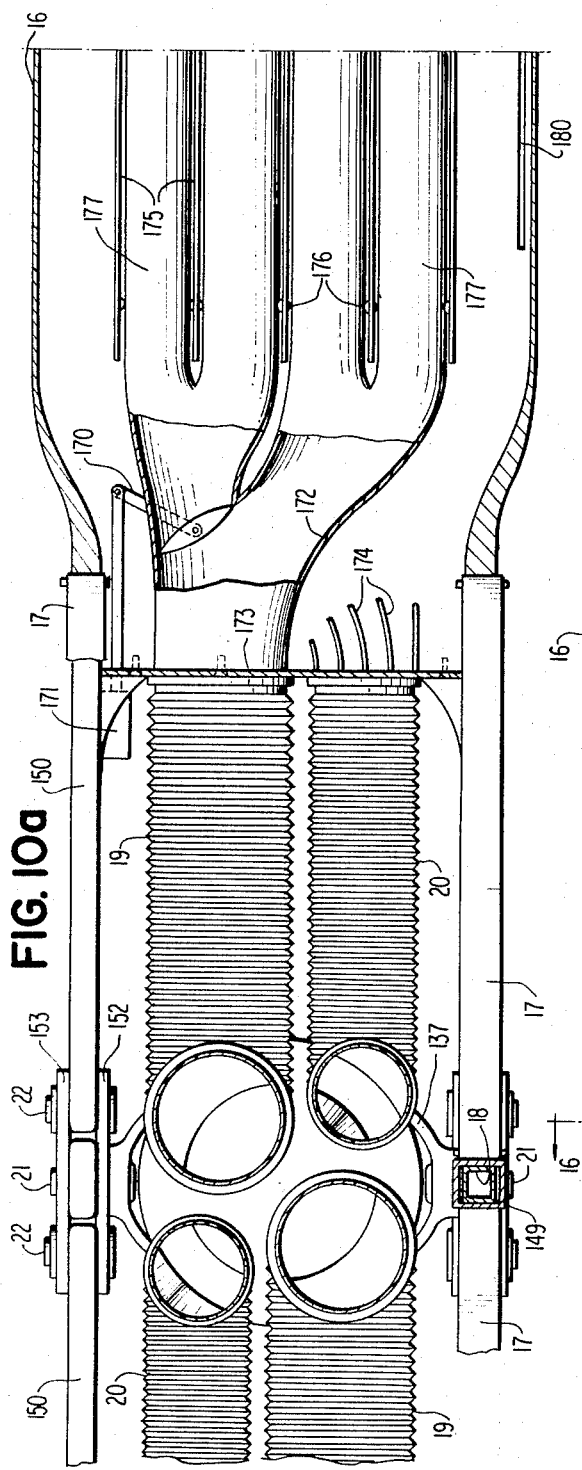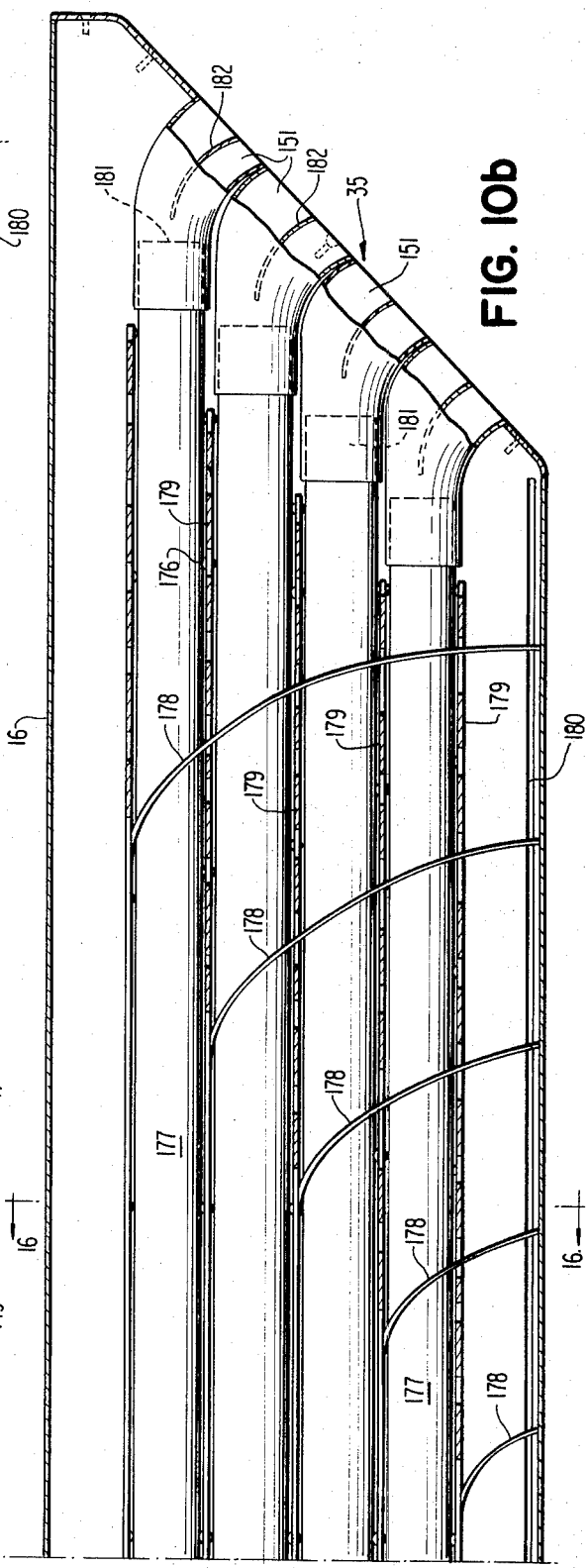

PATENTED OCT 2 1973 3,762,667
FIG. 16
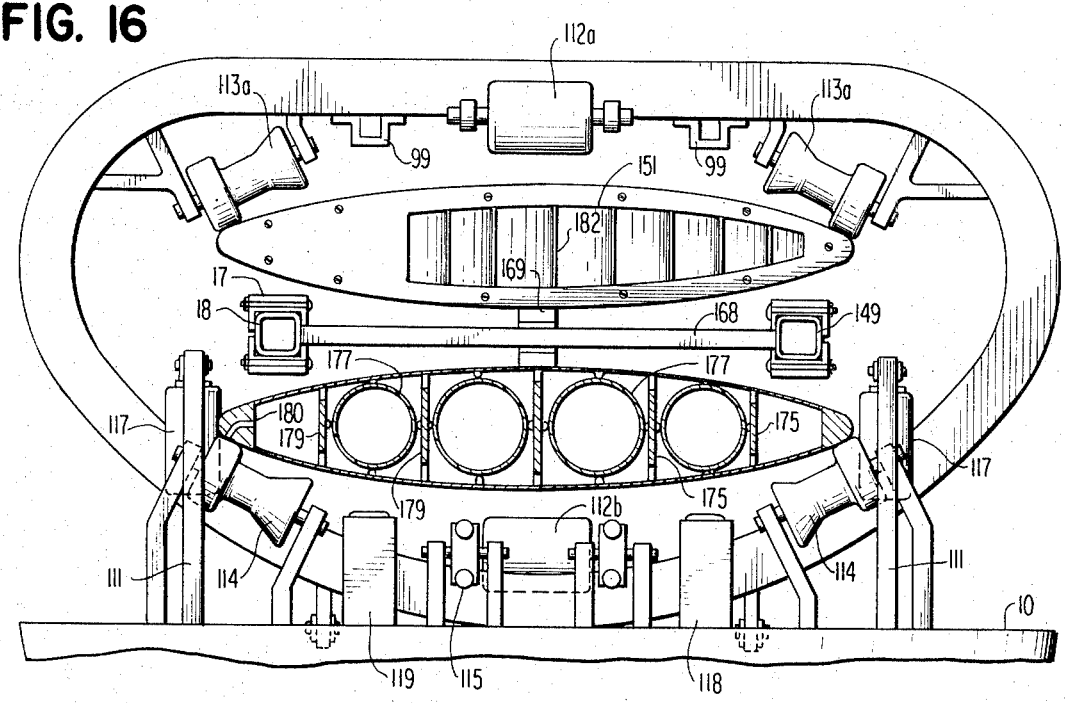
FIG. 15a
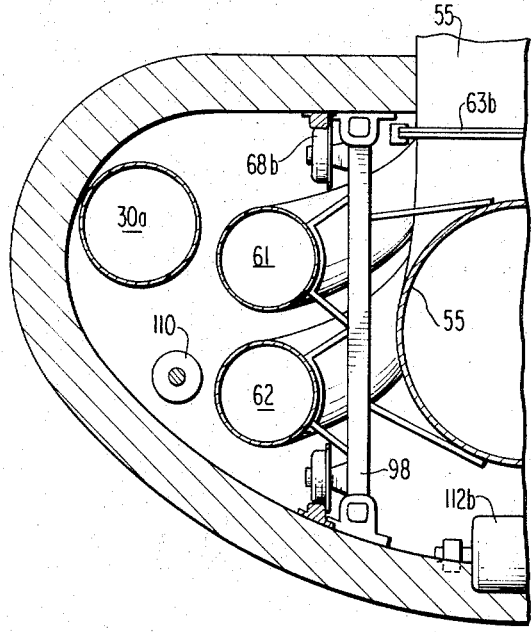
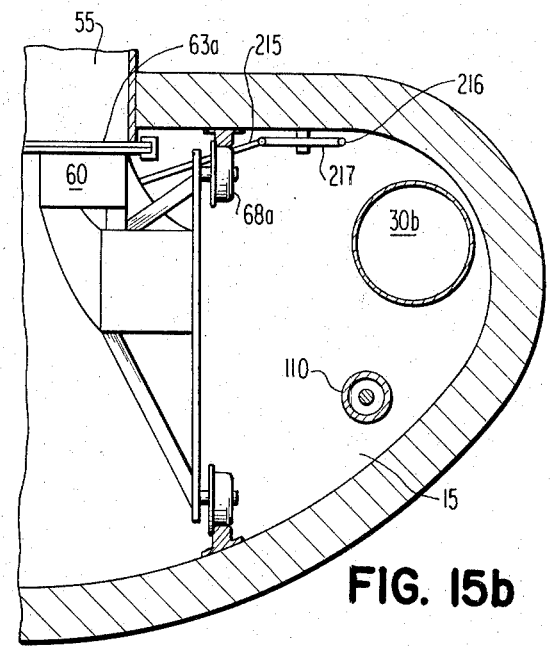
FIG. 15b

VERTICAL TAKE-OFF AND LANDING AIRCRAFT

BACKGROUND OF THE INVENTION

The present invention is an improvement upon the basic vertical take-off and landing aircraft disclosed in U.S. Pat. NO. 3,582,021 issued to David R. Pender on June 1, 1971. In that patent, an aircraft and method of operation is disclosed and claimed wherein a fixed wing airplane, such s a passenger airliner, is lifted vertically by the tail through the action of a powered tail rotor at take-off. The aircraft is then converted to standard fixed wing flight by collapsing of the tail rotor blades and retraction of the rotor into a longitudinal storage space in the fuselage. The rotor is deployed in a reverse manner for converting once again to rotor flight to effect landing of the aircraft in a vertical attitude nose downward.

The object of the present invention is to provide practical and reasonably economic means for diverting power from the aircraft jet engines to the tail rotor to produce and maintain powered rotation thereof and to accomplish rotor directional control and collective and cyclic pitch control of the rotor blades without the necessity for the complex mechanisms customarily embodied in helicopters.

In accordance with the invention, a passenger airliner of generally conventional configuration has a pair of fan jet engines or the like podded on opposite sides of the fuselage aft of the fixed wings. Valved ducting is connected into the main exhaust nozzle of each engine for diverting hot exhaust gas and cool by-pass air, either mixed or separately, from each engine into a pair of common ducts which extend aft at the center of the fuselage. The duct delivering hot exhaust gas from the aircraft engines to jet nozzles on the tips of the two bladed tail rotor communicates through a sliding seal with a movable exhaust gas duct which ultimately delivers hot exhaust gas through branch flexible conduits to internal passages of the rotor blades and through these passages to the blade tip jet nozzles. Simultaneously, the common duct for by-pass air leading from the two engines is divided into two branches and further subdivided into four separate passages which communicate cyclically and variably with quadrant passages in the rotor mast which has stationary and rotating interfaces. In this manner, the required cyclic and collective pitch control of rotor blades can be obtained without resort to awkward and complex mechanical linkages. The by-pass air diverted and delivered to the interior of the two rotor blades through the divided passage means is further directed to rotor blade jet flap slots where the resulting jet reaction produces the necessary control function on the blades and rotor, as will be fully described. Further diversionary means in the by-pass air duct system is provided to deliver by-pass air to certain fixed wing tip jet flap slots for rotor directional control, and also jet elevator slots and fixed wing jet flaps. As will be described, there elements are utilized to effectively control the craft during flight on the tail rotor and during regular fixed wing flight and during conversion to and from rotor and fixed wing flight.

A mechanical traction system is provided in the rotor storage compartment of the fuselage to retract and to begin the deployment of the articulated rotor at proper times. This means functions in conjunction with guide rollers and trackage of the rotor stowage compartment and hinged rear rotor stowage door to assure efficient deployment and retraction of the rotor.

The aircraft contains numerous additional features and advantages, including important safety features, which will be described in the detailed description, to follow. One such important feature is an arrangement whereby the tail rotor may continue to operate satisfactorily should one engine of the aircraft fail. Another important aspect of the invention to be described in detail resides in the gradual conversion or transi-tion from relatively large circular cross section jet engine exhaust gas and air passages to relatively low profile side-by-side gas and air ducts. This feature minimizes air drag at critical points on the craft and greatly simplifies the gas and air diverting valve means and controls.

Other detailed features and advantages of the invention will become apparent during the course of the following detailed description.

BRIEF DESCRIPTION OF DRAWING FIGURES

FIG. 1 is a side elevation of an aircraft embodying the invention at rest on the ground.

FIG. 2 is a rear end elevation of the aircraft with the lifting rotor retracted, the rotor being shown in broken lines in a deployed rotor flight position.

FIG. 3b is a fragmentary top plan view of the aircraft similar to FIG. 3a.

FIG. 4 is a side elevational view, partly broken away, illustrating the process of converting from rotor flight to fixed wing flight.

FIG. 5 is a side elevation, partly broken away, showing the aircraft on fixed wing flight with the rotor retracted.

Figure 7B:
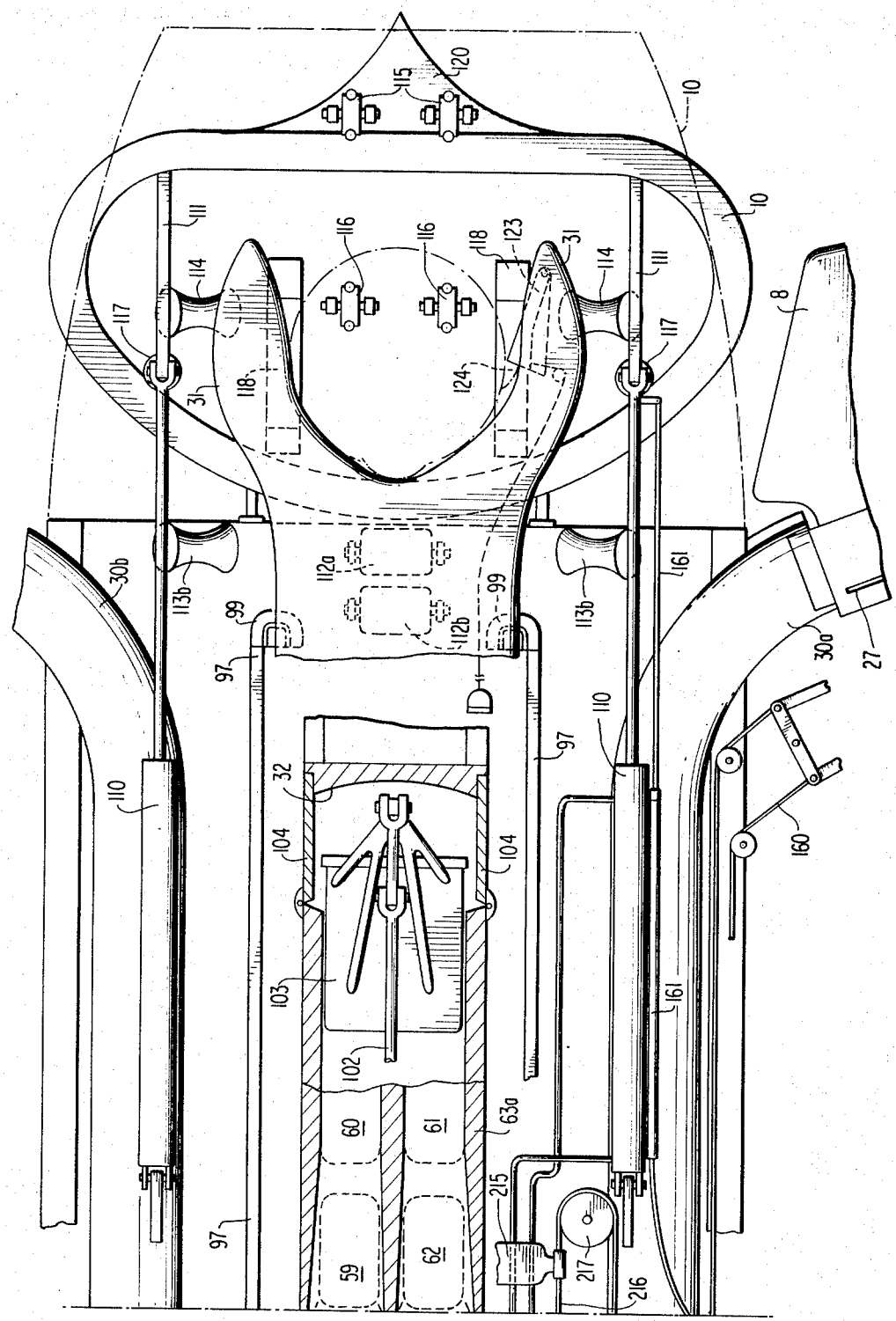

FIGS. 7a and 7b together constitute a top partly diagrammatic plan view, partly in section, of the rear of the aircraft showing the duct work and valving from the jet engines, parts omitted for clarity.

FIG. 8a is a side elevation, partly in section, of the rear portion of the aircraft showing components of the rotor in the "on ground" position.

Figure 8B:
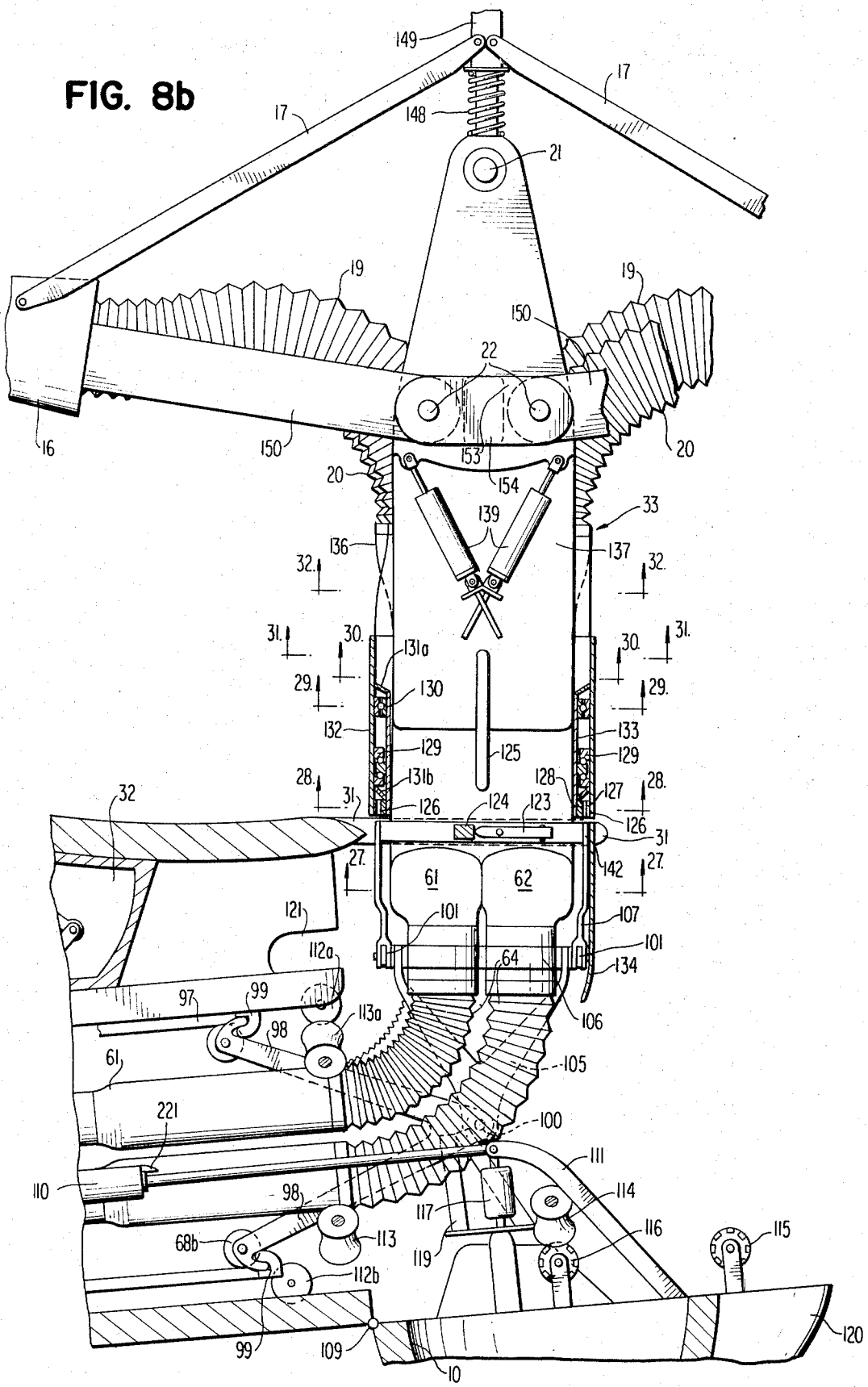

FIG. 8b is an enlarged fragmentary cross sectional view through the rotor structure in the same position depicted in FIG. 8a, parts in elevation.

FIG. 8c is an enlarged fragmentary cross section, partly in elevation, through ducting and other components in the rear of the aircraft associated with the rotor and being shown on a smaller scale in elevation in FIG. 8a.

FIGS. 9a and 9b together constitute a top plan view of the rotor structure which slides into and out of the rear end of the aircraft. The rotor blades in this figure are seen to be in the open or unfolded flying position at right angles to the rotor mast.

FIGS. 10a and 10b together constitute a longitudinal cross section, partly in elevation, through one rotor blade and hub with the rotor blade in the open or unfolded position.

Figure 11A:
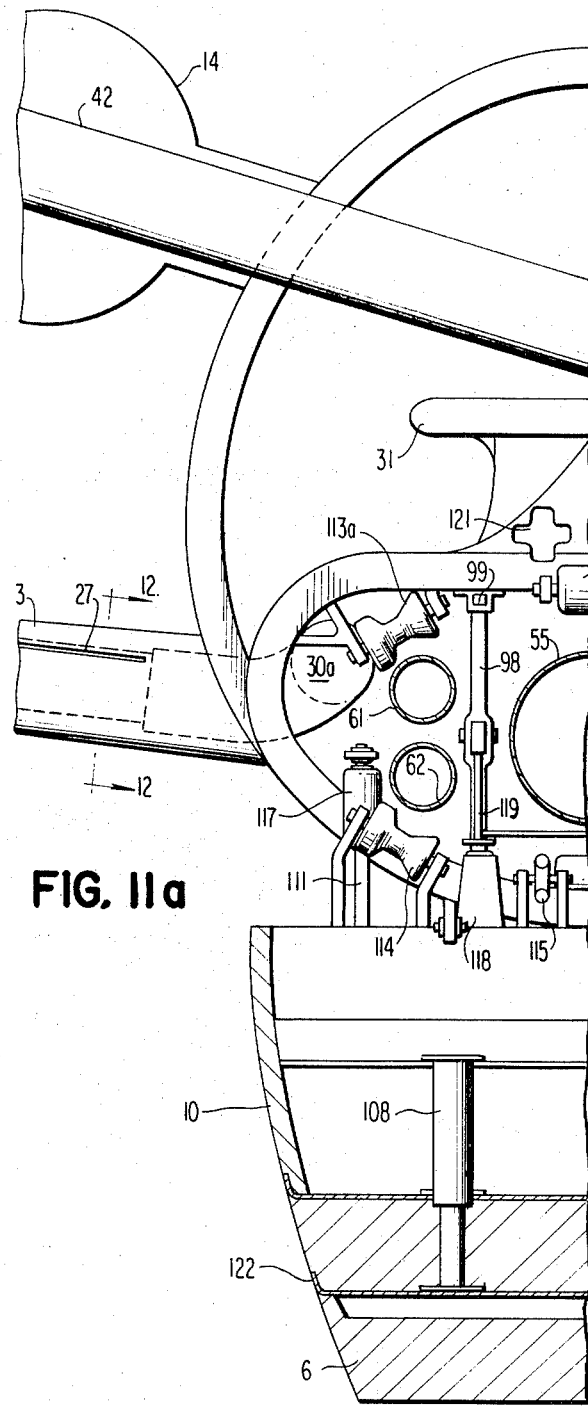

FIG. 11a is a fragmentary vertical cross section through the aircraft near the rotor storage door and tail plane.

Figure 11B:
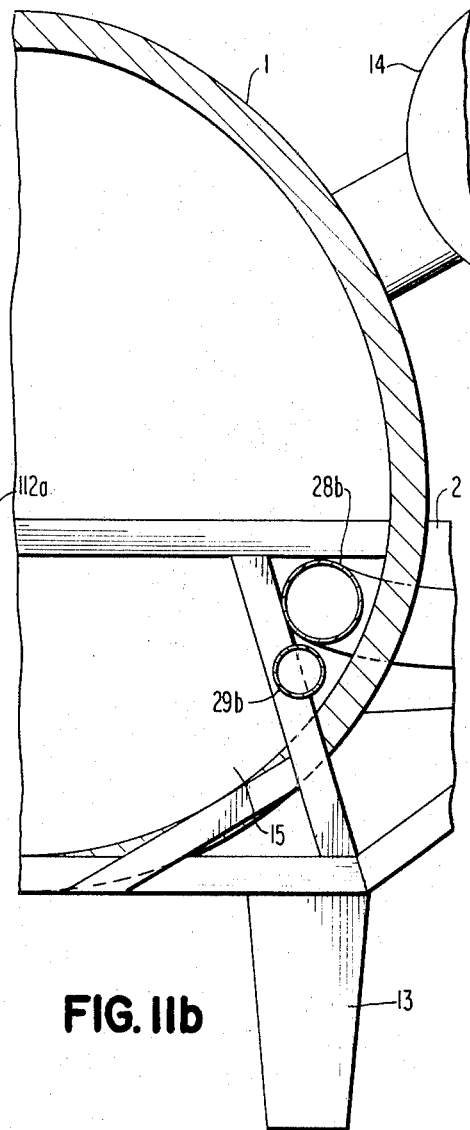

FIG. 11b is a similar cross section through the aircraft at the wing.

Figure 12:
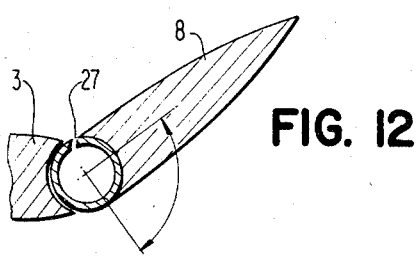

FIG. 12 is an enlarged fragmentary section taken on line 12—12 of FIG. 11a.

Figure 13:
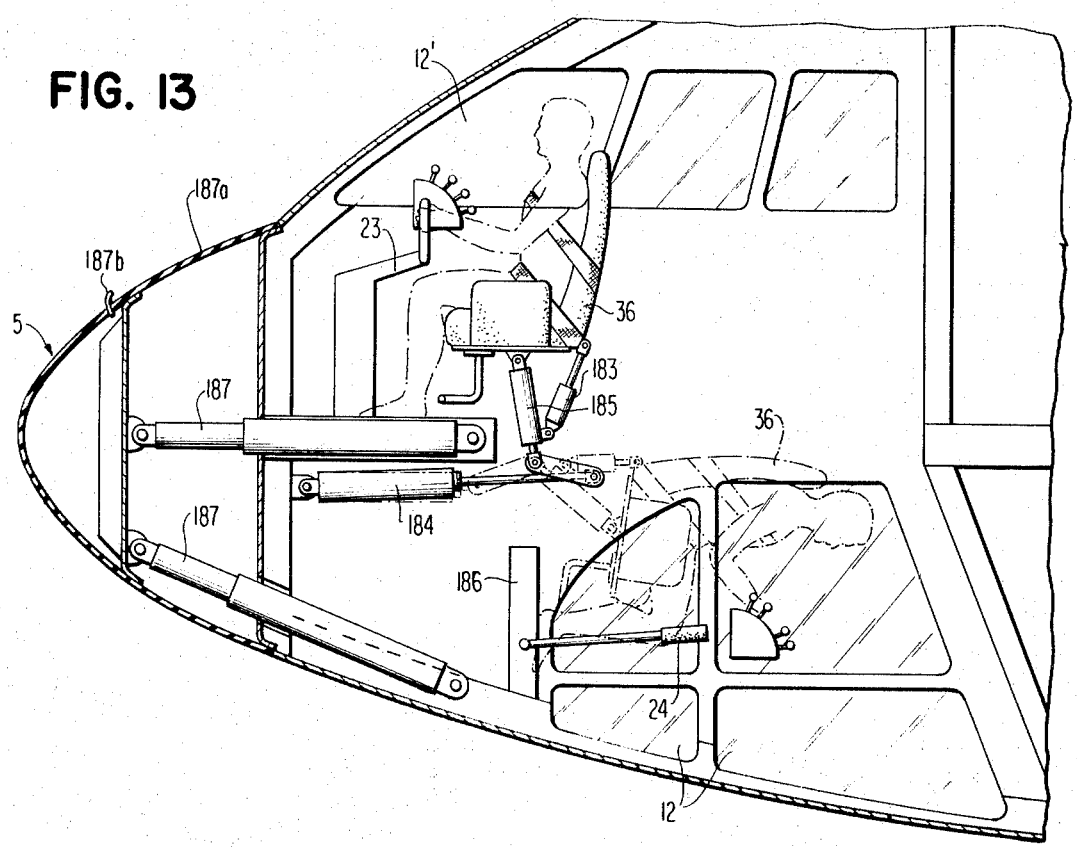

FIG. 13 is a fragmentary side elevation, partly in section, through the nose of the aircraft showing the cockpit arrangement for both fixed wing and rotor flight, and also showing a shock absorbing nose structure.

Figure 14:
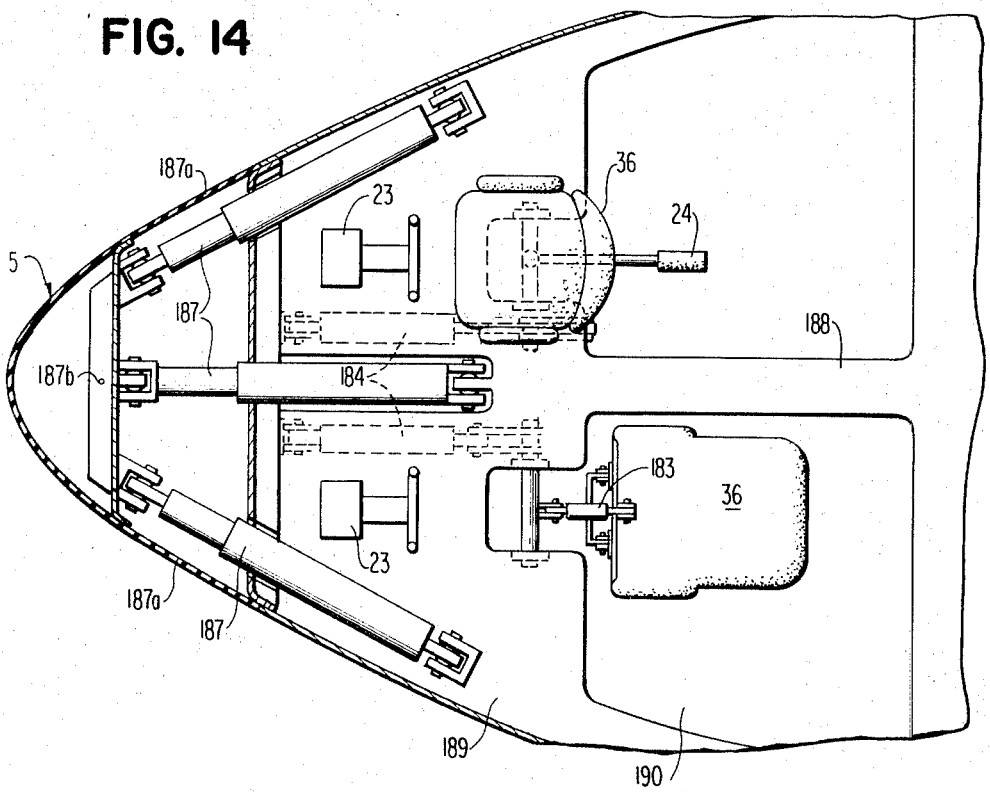

FIG. 14 is a top plan view of FIG. 13, parlty in section.

FIG. 15a is a fragmentary vertical cross section through the rotor stowage tube and associated parts taken on line 15a—15a of FIG. 8a.

FIG. 15b is a similar section taken on line 15b—15b of FIG. 8a.

FIG. 16 is a further transverse vertical section through the rotor stowage tube with the folded rotor blades inside of the same and engaging guide rollers of the stowage tube door, the top rotor blade being shown in end elevation and the lower blade in cross section approximately on lin 16—16 of FIG. 10b.

Figure 17:
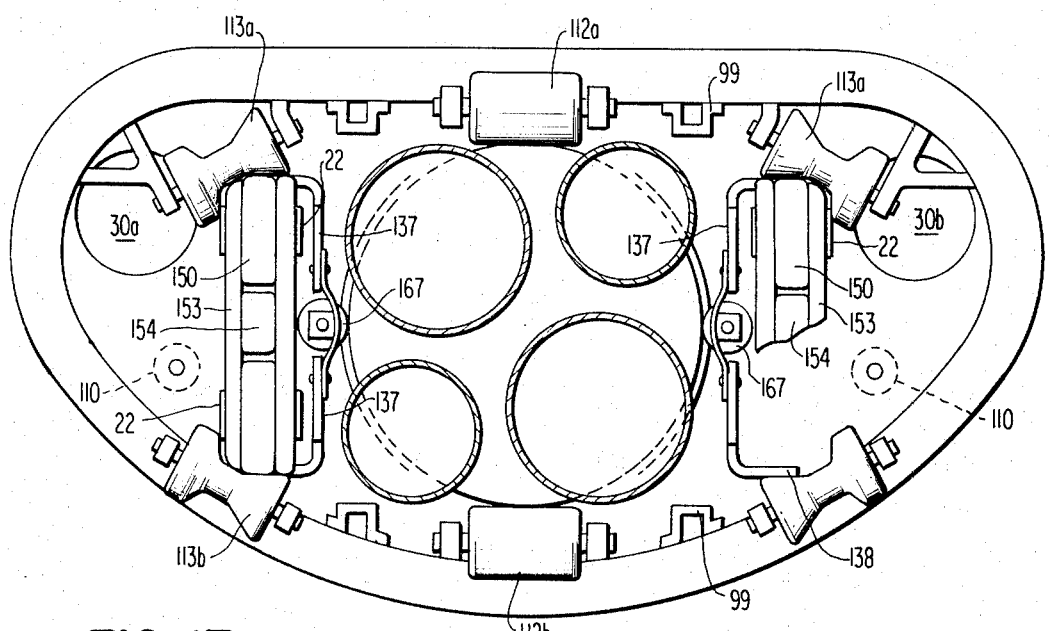

FIG. 17 is another vertical section through the rotor stowage tube taken substantially on line 17—17 of FIG. 9b.

Figure 18:
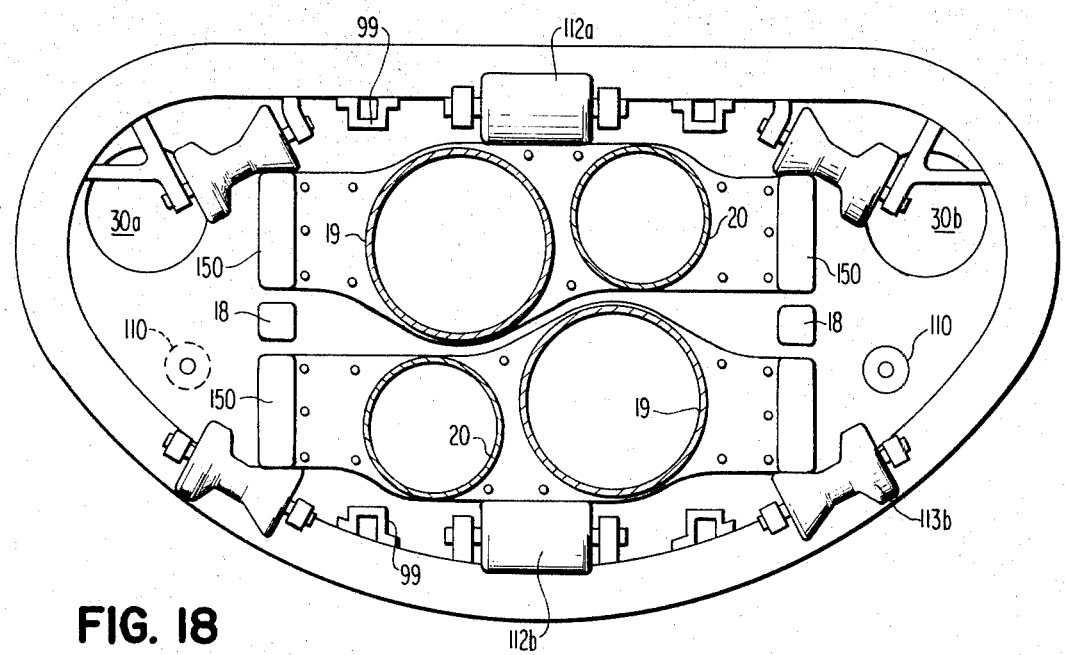

FIG. 18 is a similar section through the rotor stowage tube near the roots of the rotor blades.

Figure 3A:
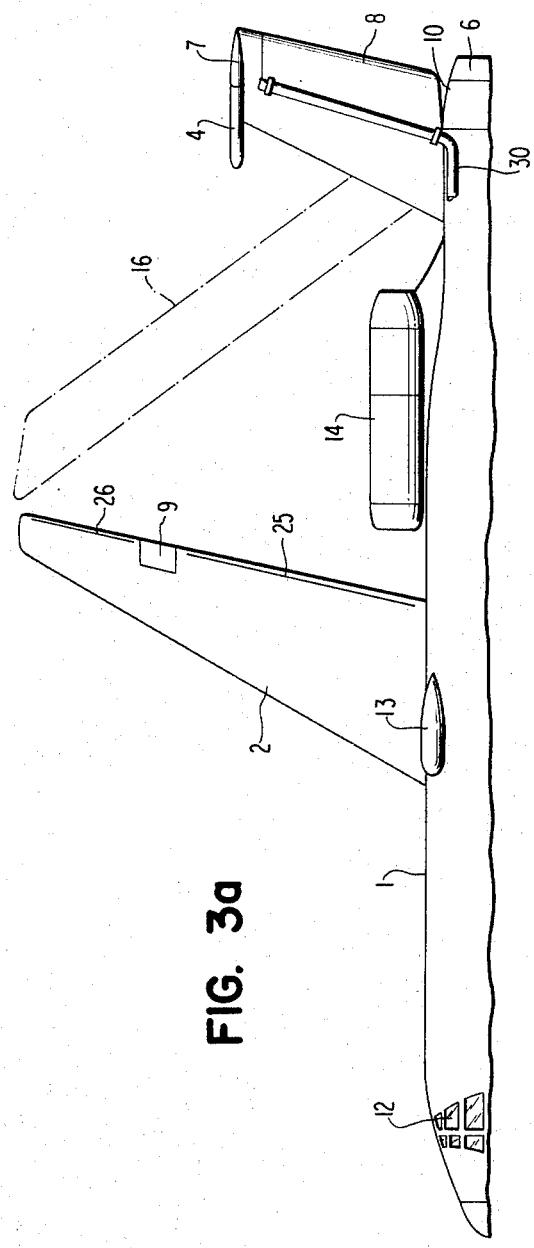
FIG. 3a is a fragmentary bottom plan view of the aircraft with the rotor retracted, the rotor outline in a flight position being shown in broken lines.
Figure 3B:
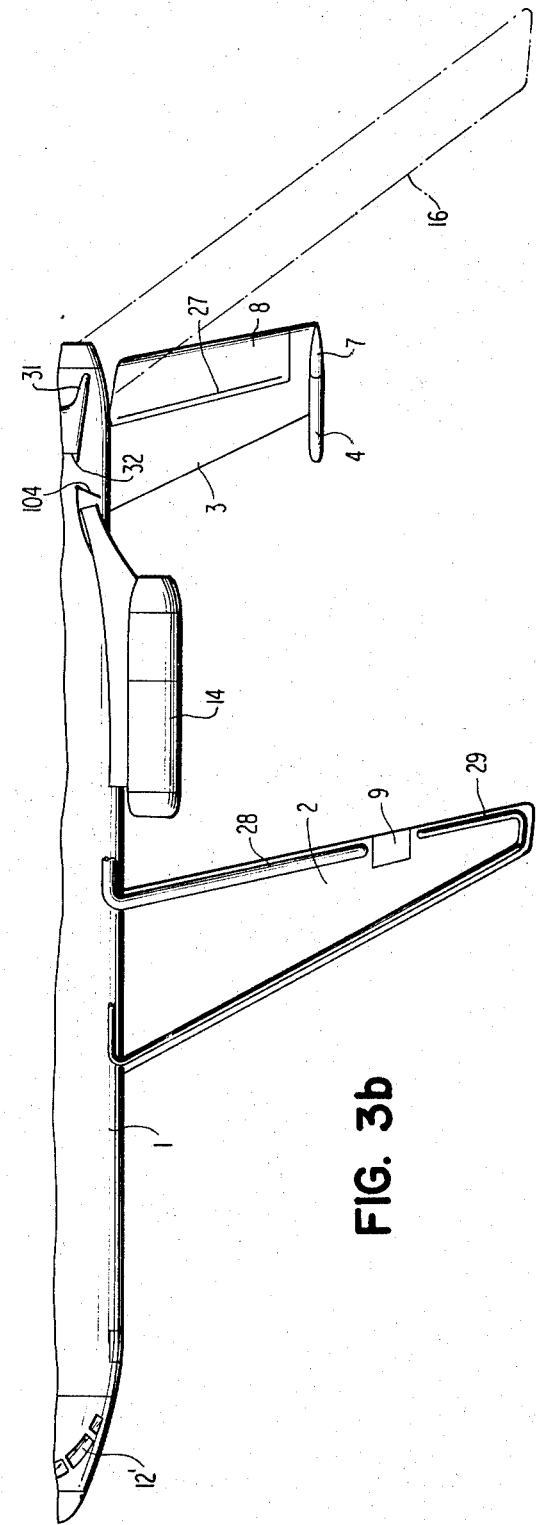
Figure 6:
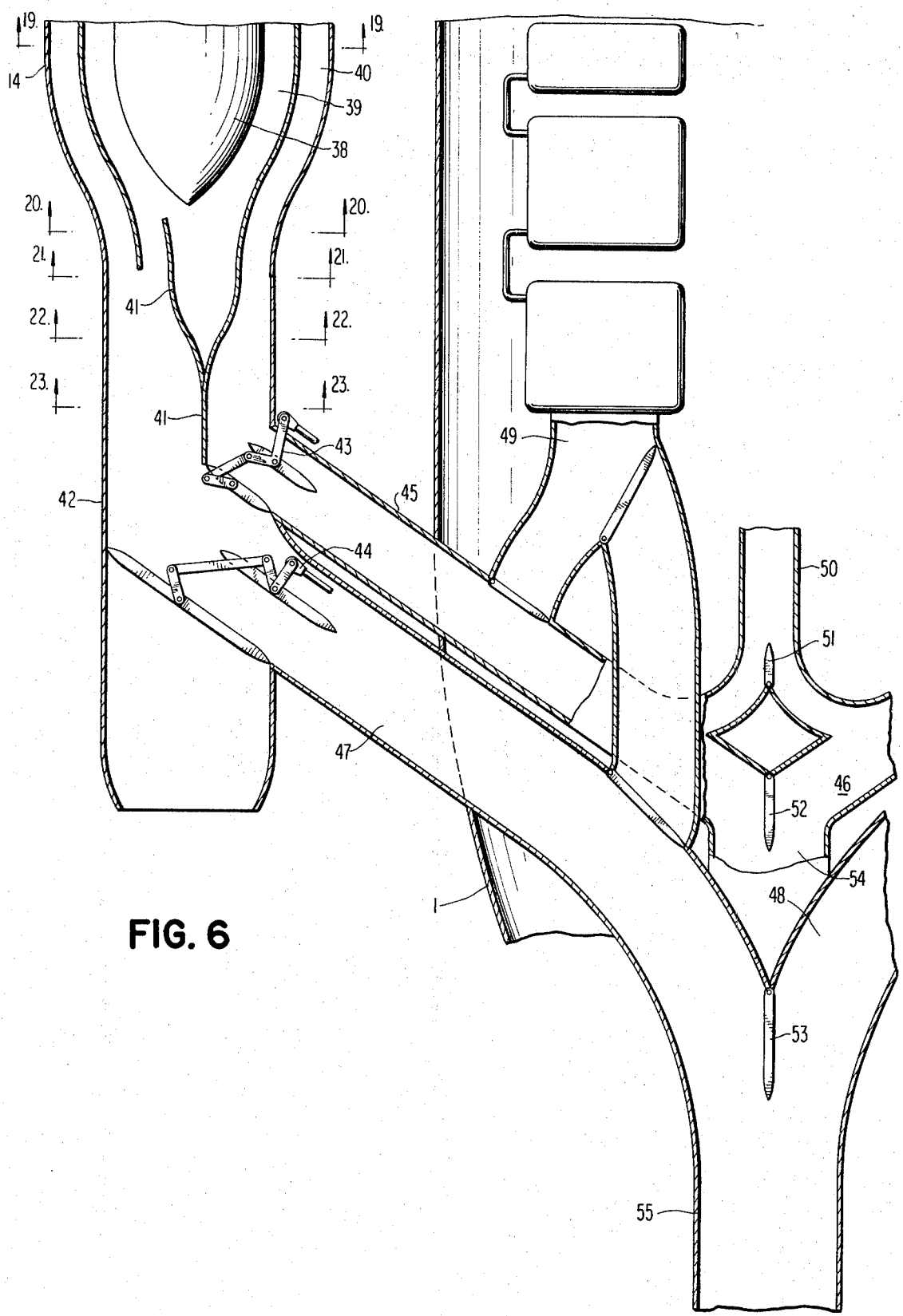
FIG. 6 is a fragmentary horizontal cross section of one engine of the aircraft and the associated ducts and diverter valves leading to the rotor.
Figure 19:
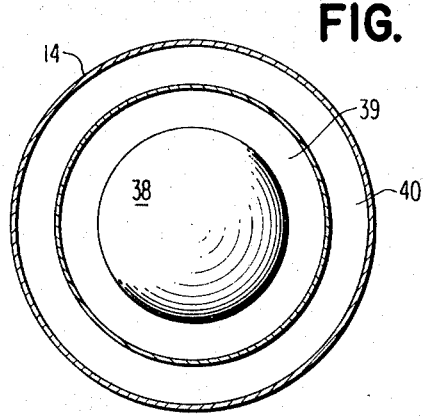

FIG. 19 is a transverse vertical section taken on line 19—19 of FIG. 6.

Figure 20:
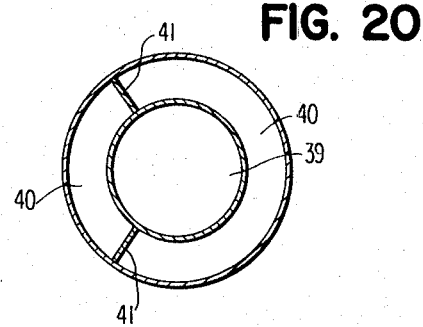

FIG. 20 is a similar section taken on line 20—20 of FIG. 6.

Figure 21:
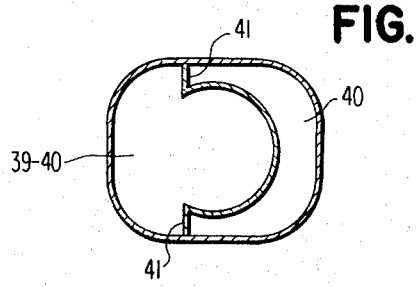

FIG. 21 is a similar section taken on line 21—21 of FIG. 6.

Figure 22:
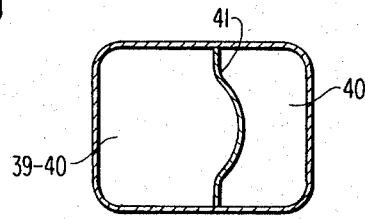

FIG. 22 is a similar section taken on line 22—22 of FIG. 6.

Figure 23:
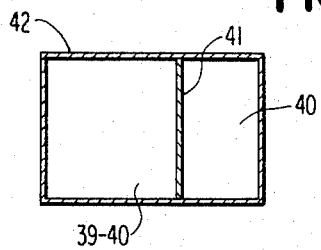

FIG. 23 is a similar section taken on line 23—23 of FIG. 6.

Figure 24:
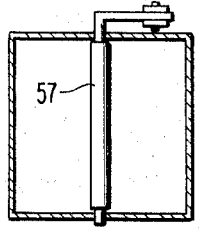

FIG. 24 is a vertical section taken on line 24—24 of FIG. 8c.

Figure 25:
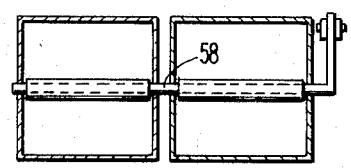

FIG. 25 is a similar section taken on line 25—25 of FIG. 8c.

Figure 26:
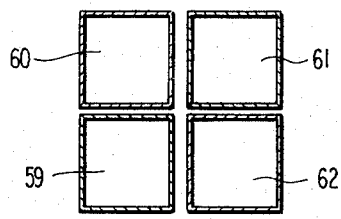

FIG. 26 is a similar section taken on line 26—26 of FIG. 8c.

FIG. 27 is a horizontal section taken on line 27—27 of FIG. 8b.

FIG. 28 is a similar section taken on line 28—28 of FIG. 8b.

FIG. 29 is a similar section taken on line 29—29 of duct 8b.

FIG. 30 is a similar section taken on line 30—30 of FIG. 8b.

FIG. 31 is a similar section taken on line 31—31 of FIG. 8b.

FIG. 32 is a similar section taken on line 32—32 of FIG. 8b.

Figure 33:
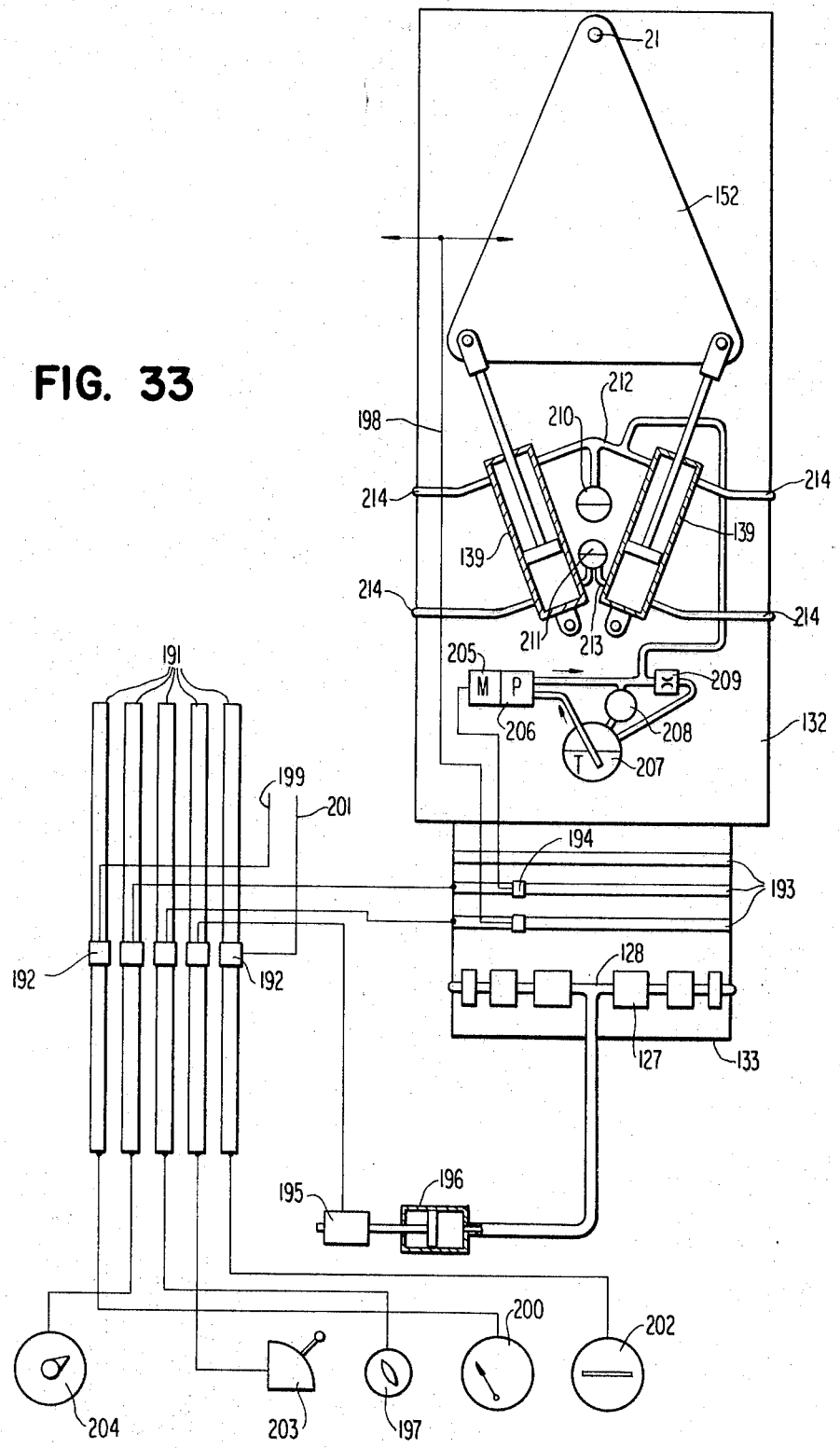

FIG. 33 is a schematic view of the electro-hydraulic system for a rotor brake, teeter hinge control and associated elements.

NOMENCLATURE

1. Fuselage
2. Wing
3. Tail Plane
4. Vertical Stabilizer
5. Shock Absorber Nose
6. Shock Absorber Tail
7. Rudder
8. Elevator
9. High Speed Aileron
10. Rotor Stowage Door
11. Cargo Door
12. Rotor Flight Windows
12'. Fixed Wing Flight Windows
13. Skid Landing Gear
14. Jet Engine Nacelle
15. Rotor Stowage Tube
15'. Floor
16. Rotor Blade
17. Opposed Blade Synchronizer and Static Blade Support Arm
18. Blade FOld-Up Slide Pole
19. Blade Flexible Duct for Exhaust Gases to Blade Tip Nozzle
20. Blade Flexible Duct for By-pass Air for Jet Flaps
21. Rotor Teeter Hinge
22. Rotor Blade Fold-up Hinge
23. Fixed Wing Flight Controls
24. Rotor Flight Cyclic Pitch Control Stick
25. Wing Jet Flap Slot
26. Combination Jet Flap Wing Tip Slot for Rotor Flight Directional Control and Fixed Wing Low Speed Aileron
27. Variable Angle Jet Elevator Slot
28. Duct for Wing Jet Flap a. left b. right
29. Duct for Jet Aileron a. left b. right
30. Duct for Jet Elevator a. left b. right
31. Static Ground Rotor Mast Support Yoke
32. Fixed Target Thrust Reverser/Spoiler
33. Rotor Mast
34. Cargo Compartment
35. Blade Tip Thrust Nozzle
36. Tiltable, Rotatable Pilot's Seat
37. Rear-Facing Passenger Seats
38. Jet Engine Tail Cone
39. Jet Engine Hot Exhaust Gas
40. Jet Engine By-pass Air
41. Jet Engine Thrust Separator
42. Engine Rectangular Jet Exhaust Nozzle
43. By-pass Air Diverter Valve (Collective Pitch Control)
44. Engine Hot Exhaust Gas Diverter Valve
45. Left Engine By-pass Air Duct
46. Right Engine By-pass Air Duct
47. Left Engine Hot Exhaust Gas Duct
48. Right Engine Hot Exhaust Gas Duct
49. Emergency Gas Thrust Unit
50. Common Duct for Combination Jet Aileron and Rotor Flight Directional Control
51. Automatic Engine Out Flip-Flop Valve (for Jet Aileron)
52. Automatic Engine Out Flip-Flop Valve (for By-pass Air)
53. Automatic Engine Out Flip-Flop Valve (for Hot Exhaust Gases)
54. Combined By-pass Air Duct
55. Combined Hot Exhaust Gas Duct
56. Diverter Valve to Fixed Surfaces Jet Flaps
57. Pitch Control Valve for Rotor Cyclic Pitch Control
58. Lateral Control Valve for Rotor Cyclic Pitch Control
59. 1st Quadrant Control Air Duct
60. 2nd Quadrant Control Air Duct
61. 3rd Quadrant Control Air Duct
62. 4th Quadrant Control Air Duct 63. Main Rotor Sliding Jet Gas Seal a.Upper Lip b.Lower Lip
64. Air Craft to Rotor Mast By-pass Flexible Ducts
65. Air Craft to Rotor Mast Hot Exhaust Flexible Duct
66. Sliding Main Hot Exhaust Gas Duct
67. Slliding By-pass Ducts
68. Rotor Carriage Wheel System a. Front b. Rear
97. Retracting Wheel Rails
98. Main Rotor Anchor Hook
99. Main Rotor Anchor Hook Receiver
100. Main Floating Rotor Pitch Axis Bearing
101. Main Floating Rotor Lateral Axis Bearing
102. Thrust Reverser Actuator
103. Thrust Reverser Diverter Door
104. Thrust Reverser Side Door (Spring-loaded in Closed Position)
105. Yoke Joining Lateral and Pitch Axis Bearings
106. Lateral Axis Ring
107. Lateral Axis Extension Arm
108. Tail Landing Shock Strut
109. Rotor Stowage Door Hinge
110. Rotor Stowage Door Actuator
111. Rotor Stowage Door Actuator Arm and Blade Position Guide
112. Center Rotor Stowage Tube Rollers a. Top b. Bottom
113. Side Rotor Stowage Tube Rollers a. Top b. Bottom
114. Side Rotor Stowage Door Rollers
115. Rear 2-Way Stowage Door Roller
116. Forward 2-Way Stowage Door Roller
117. Lateral Stowage Door Rotor Blades Guide Roller
118. Rotor Load Transfer to Stowage Door Pillow Block
119. Rotor Load Transfer to Stowage Door Stand
120. Stowage Door Rotor Blade Positioner Guide
121. Wheel Well for Rear 2-Way Stowage Door Roller
122. Flexible Rubber Cover
123. Rotor Ltach on Static Ground Rotor Mast Support Yoke
124. Rotor Latch Catch (on Rotor Mast) for Rotor Latch
125. Rotor Blade Positioner Arms (for Rotor Stowage)
126. Rotor Brake Drum
127. Rotor Brake Pads
128. Rotor Brake Expansion Tube
129. Main Rotor Thrust Bearing
130. Main Rotor Radial Bearing
131. Main Bearing Seals a. Upper b. Lower
132. Outer Rotating Main Rotor Mast
133. Inner Non-Rotating Main Rotor Mast
134. Skid Extension for Rotor Retraction
135. By-pass Air Passage
136. Duct Configuration Modifier Unit (Rotating Unit)
137. Rotor Head Fork
138. Side Plate Track for Rotor Retracting Rollers
139. Rotor Flapping Control Cylinders
140. Main Rotor Mast Hot Exhaust Gas Duct (Non-Rotating)
141. By-pass Air Separator Vanes
142. Main Rotor Mast Support Ring
143. Main Hot Gas Duct Rotating Seal
144. Main Hot Gas Divider Seal
144a Main By-pass Air Divider Seal
145. Hot Exhaust Gas To: (a) First Blade; (b) Second Blade
146. By-pass Air To (a) First Blade; (b) Second Blade
147. Main Hot Gas Duct Stationary Seal
148. Blade Droop-Stop Spring
149. Blade Fold-Up Slide Unit
150. Blade Root Arms
151. Blade Tip Jet Nozzle
152. Split Hub Blocks
153. Split Hub Plates Connector
154. Hub Block-Hub Plate Separator
155. Diverter Valve for Fixed Wing Jet Flaps
156. Diverter Valve for Jet Elevator Flaps
157. Connector Bar for Jet Elevator Flap Valves
158. Control Valve for Jet Aileron or Rotor Directional Control
159. Latch Control Handle (in Cockpit) (for Rotor Mast Ground Support Yoke)
160. Elevator Controls Cables
161. Rotor Stowage Door Position Indicator
162. Rotor Stowage Door Position Indicator Read-Out (in Cockpit)
163. Hydraulic Booster Cylinder for Elevator Controls (Interconnected with Rotor Stowage Door Actuator)
164. Control for Rotor Stowage Door Actuator (in Cockpit)
165. Control for Hydraulic Booster Cylinder for Elevator (in Cockpit)
166. By-pass Air Ducts to Rotor Mast Converter
167. Rotor Lateral Load Bearing Roller Unit
168. Connector for Blade Fold-Up Slide Unit
169. Separator or Stand-Off Pad for Folded Rotor Blades
170. One-Engine-Out Blade Thrust Cut-Out Valve
171. Solenoid for Cut-Out Valve
172. Double Bifurcated Blade Jet Thrust Distributor Manifold
173. Blade Root Plate
174. By-pass Air Dispersion Vanes
175. Blade Longitudinal Stringers
176. Thrust Duct Stand-Off Knobs
177. Blade Jet Thrust Ducts
178. Blade By-pass Air Separator (and Blade Stiffeners)
179. Holes in Longitudinal Stringers for By-pass Air Passage
180. Rotor Blade Jet Flap Slots
181. Thrust Ducts Heat Expansion Slip Joints
182. Jet Nozzle Cascades
183. Seat Tilting Actuator
184. Seat Lowering Actuator
185. Seat Swivel Axis
186. Cockpit Floor for Rotor Flight
187. Nose Shock Strut System
187a Flexible Rubber Nose Cover
187b Air Valve for Inflated Nose Tip
188. Pilot's Compartment Cat-Walk
189. Pilot's Compartment Floor for Fixed Wing Flight
190. Opening in Floor for Passage of Pilot's Seat and Pilot for Rotor Flight
191. Straight Fixed Position Electrical Conductor Strips (Runs Length of Stowage Tube)

192. Electrical Brush Contacts
193. Circular Electrical Conductor Strips
194. Brush Contacts for Circular Electrical Conductor Strips
195. Electrical Brake Solenoid Actuator
196. Hydraulic Rotor Brake Cylinder
197. On-Off Switch for Solenoid for One Engine Out Blade Thrust Cut-Out Valve
198. Electrical Line to Solenoid
199. Line to R.P.M. Unit
200. R.P.M. Gauge
201. Line to Rotor Position Indicator
202. Rotor Position Indicator
203. Rotor Brake Control Unit
204. Teetering Hinge Control Regulating Swtich
205. Variable Speed Motor
206. Hydraulic Motor
207. Hydraulic Fluid Tank
208. Pressure Relief Valve
209. Calibrated Restrictor
210. Cylinder Contraction Accumulator
211. Cylinder Expansion Accumulator
212. Cylinder Contraction Interconnecting Line
213. Cylinder Extending Interconnecting Line
214. Lines to Opposite Pair of Cylinders
215. Rotor Carriage Arm
216. Rotor Carriage Cable
217. Rotor Carriage Tension Pulley
218. Rotor Carriage Drive Pulley
219. Rotor Carriage Reversible Drive Motor
220. Rotor Carriage Drive Motor Switch (in Cockpit)
221. Door Actuator Guide Ramp for Block Position Arms

DETAILED DESCRIPTION

ROTOR PROPULSION AND CONTROL SYSTEM

Jet engine thrust is diverted to the rotor system by control valves 43 and 44, FIG. 6. Valve 44 diverts hot exhaust gas to blade tip nozzles 151 for rotor thrust. Valve 43 diverts by-pass air to the rotor blade jet flap slots 180, FIGS. 10a and 10b, for rotor pitch control. The by-pass air diverter valve 43 can be considered as the collective pitch control valve for the rotor comprising the two blades 16. When the by-pass air is not fully diverted, part of it flows in with the hot exhaust gas going to the blade tip nozzles 151.

By-pass air from the left engine enters duct 45, FIG. 6, and converges with and combines with a like duct 46 from the right engine, so as to form a common by-pass air duct 54. Likewise hot exhaust gas from the left engine enters the duct 47 and combines with a like duct 48 from the right engine to form a common duct 55 for hot engine exhaust gas, FIG. 6. Automatic engine-out flip-flop valves 52 and 53 insure rotor operation from one engine only for both hot gas ducts and by-pass air ducts, should the other engine fail.

Upstream of the diverter valves 43 and 44 is a duct system designed to fit over the rear end of the low by-pass ratio jet engine. This duct system occupies the space normally occupied by the thrust reverser in conventional fixed wing aircraft. In the conventional by-pass jet engine, the by-pass air flows in a circular outer duct that surrounds an inner concentric duct for hot exhaust gases, as shown respectively at 40 and 39 in FIG. 6. The duct system of the present invention, in effect, converts these two concentric circular ducts into two side-by-side rectangular ducts, as shown in FIGS. 19-23, which are cross sectional views showing the gradual transition. The outer and larger segment of the rectangular duct, FIG. 23, designated 39-40, is for hot exhaust gas, and if desired, a part of the by-pass air from the engine. The inner segment 40 of the rectangular duct, FIG. 23, is for by-pass air, and this cross sectional configuration in FIG. 23 is immediately upstream from the diverter valves 43 and 44 as clearly shown by the section lines in FIG. 6. It should be mentioned at this time that an alternate ducting system may be employed in some cases where there will be no mixing of the hot exhaust gases with cold by-pass air, in which case the diverter valves will not be required. While the invention is illustrated and described in terms of structure where mixing is employed, it should be understood that the invention is not limited to this embodiment and may be constructed without the mixing of gases. In the latter case, the hot exhaust gases will energize the rotor blade tip nozzles to produce thrust to turn the rotor and the by-pass air will be utilized with the rotor blade jet flap slots 180 for rotor pitch control.

The reason for the recantgular duct system is to simplify the arrangement of the diverter valves 43 and 44. A diverter valve arrangement which attempted to separately divert both hot exhaust gas and by-pass air from concentric circular ducts while possible to achieve would be far more complex. Furthermore, a system which attaches to the end of a conventional engine is more practical from a manufacturing and maintenance standpoint than to attempt to integrate a diverter valve design in the engine proper.

The rectangular cross section duct system which contains the rectangular valves 43 and 44 also has connecting rectangular ducts 45 and 47 which divert gases from the engine nacelle to the fuselage. These ducts must pass through or behind the structure that connects the engine nacelles to the fuselage 1. This engine support structure must be as thin as possible to minimize profile or parasitic drag. By using rectangular ducts, which may be low and wide, much larger volumes of air can pass through the relatively narrow engine nacelles and the support structure than would be possible with circular ducts. These "low profile" ducts are an important factor which make the conventional fixed wing rear podded engine location practical for the present jet rotor VTOL.

The convertion of the conventional circular jet engine thrust nozzle to the rectangular jet exhaust nozzle 42 results in only slight loss of thrust for fixed wing flight which can be tolerated. The above bolt-on circular to rectangular gradual conversion duct structure is illustrated in FIGS. 19 through 23 of the drawings.

CYCLIC PITCH CONTROL

Cyclic pitch control is accomplished in this fixed pitch rotor system by cyclically varying the quantity of by-pass air to rotor blade jet slots. This is accomplished in the following manner.

The common by-pass air duct 54 is bifurcated into two ducts, and these two ducts are each bifurcated into two additional ducts so that there is a total of four ducts being fed from the common by-pass duct 54. These four ducts are integrated into the outer shell of the rotor mast into four equal quadrants that surround the main rotor mast hot exhaust gas duct 140. This part integrated into the outer shell of the rotor mast is identified by the numeral 166 and is termed the by-pass air duct to rotor mast converter, see FIGS. 27 and 28.

By-pass air can be differentially directed to each of the four quadrant air ducts by valves 57 and 58. The valve 57 is the pitch ontrol valve for cyclic pitch control, and is located immediately upstream from the first bifurcation and can direct air to the two left-hand quadrants 59 and 60 or to the two right-hand quadrants 61 and 62, selectively. This pitches the rotor forwardly or rearwardly, respectively.

Valve 58 is a lateral control valve for cyclic pitch control of the rotor and is a dual valve with single control lever immediately downstream from the valve 57. The valve 58 fits inside of the two air ducts leading from the first bifurcation, and directs air to the upper ducts 60 and 61 or lower ducts 59 and 62, and tilts the rotor to either the left side or right side respectively. The valves 57 and 58 are operated 90° out of phase upstream with the actual tilting of the rotor caused by gyroscopic precession. The valves 57 and 58 are connected to the rotor flight cyclic pitch control stick 24 in the cockpit. Stick movement can operate any combination of valve movements for regulating air flow in any of the four quadrants to tilt the rotor in the required direction at any given moment.

A critical juncture of this cyclic pitch control system is at the interface between the non-rotating and rotating parts of the rotor mast, FIGS. 30 and 31. In FIG. 30, elements 140, 147 and 141 are all non-rotating elements, and in FIG. 31, all of the parts shown are components of the rotating mast structure. The by-pass air for rotor control is fed up through the four non-rotating quadrants 59, 60, 61 and 62. The mating by-pass air duct on the rotating part of the mast, elements 146a and 146b, FIG. 31, has its two half-circle portions leading to the rotor blades and in turn to the rotor blade jet flap slots 180. Each half-circle rotating duct 146a and 146b spans two stationary quadrants. As each half-circle duct 146a and 146b, in rotating, cuts off part of the retreating stationary quadrant, FIG. 30, it also cuts into a part of the forward quadrant which is 180° advanced. Therefore, in rotating, one whole quadrant and parts of two adjacent quadrants are continuously under each rotating semi-circular by-pass duct 146a and 146b, except at the instant the rotor is at the 0°, 90°, 180° or 270° position, in which case the semi-circular duct in question will span completely two adjacent quadrant ducts. This provides for continuous mixing of high volume air ducts with low volume ducts in cyclic control to provide a gradual shift in the by-pass air to the rotor jet flap slots as the rotor moves around in azimuth, which gives the effect of a gradual change of rotor blade pitch around the azimuth axis similar to the gradual change in blade pitch conventionally brought about by the mechanical swash plate in a typical helicopter rotor cyclic pitch control mechanism. Such complicated mechanism with its inherent problems is totally eliminated by the present invention and the pitch controls are achieved totally by the use of the jet flap means and coacting by-pass air valving and directing means, as described.

For the center hot exhaust gas duct 140, a non-rotating seal 147 mates with a rotating seal 143, FIGS. 30 and 31. The divider 144 directs one-half of the hot gases to one rotor blade 16 and the other half to the other rotor blade. The extension 144a of this divider separates the by-pass air into semi-circular duct passages. For all of these semi-circular ducts, both hot gas and by-pass air, 145a and 145b and 146a and 146b, the same are converted into circular ducts by a duct configuration modifier unit 136, FIG. 32. This unit is devised so that flexible circular cross section ducts 19 and 20 can join this unit to blade duct openings at the roots of the blades.

DIRECTIONAL CONTROL DURING ROTOR FLIGHT

Directional control on rotor flight is accomplished by fixed jet flap slots 26 on the underside of the trailing edge of the fixed wings 2 near the tips of the wings. These wing tip jet flap slots also function as low speed ailerons during fixed wing flight, at speeds too slow for the mechanical high speed ailerons 9 to be effective. The low speed jet ailerons are useful when the aircraft slows down for conversion to and from rotor flight and also for some emergency fixed wing landings.

By-pass air for the wing tip jet flaps 26 is control valve 58, as well as the other two cyclic pitch control valves 57 and ducts 45 and 46 to form a common wing tip jet flap duct 50. The automatic flip-flop valve 51 greater than successful operation where one engine of the craft fails. Differential air flow is provided for each wing tip wheels parallel flap 26 by a rotor directional control valve 158 to direct air to ducts 29a or 29b. This valve is connected to rudder pedals in the rudder flight control compartment of the cockpit; and also may be connected to the fixed wing aileron controls for the low speed ailerons.

It is to be noted that the butterfly type directional valves 57 and 58 are not symmetrical, but off-center so that the surface areas of these valves downstream of their axes is greaterthan the surface area upstream of the axes. This will cause the valves to automatically center themselves like caster wheelsparallel to the gas stream flow, so that the stick or rudder controls will automatically return to neutral. This effect will tend to impart to the rotor system a stick-free stability.

THE ROTOR HUB AND MAST

The rotor hub has a center teetering hinge 21 and off-center blade fold-up hinges 22 and blade support arms 17 which are attached to a center blade fold-up slide support unit 149. There are two sets of blade support arms 17 and two sets of the blade fold-up slide support units 149, one set for the leading edge of the rotor blade and one set for the trailing edge. The two units 149 are joined by a connector 168, FIG. 9b.

During rotor blade fold-up, the units 149 slide up on the blade fold-up slide pole 18. This fold-up system including the arms 17, slide units 149 and pole 18 provide for symmetrical folding of the rotor.

On rotor blade deployment, the system keeps the opposed blade coning angle symmetrical. If these blades were not connected, on the beginning of rotation, gravity would allow the loosely disposed lower blade to flap asymmetrically causing erratic shaking of the entire rotor and tail section of the aircraft; that is to say, the rotor would be out of balance at the beginning of rotation.

The system also provides for a static droop stop for the rotor blades 16. Wear is greatly reduced in the fold-up hinges 22 of the rotor blades. The variable coning angle hinges are subject to centrifugal stresses, but these hinges have limited and infrequent relative movements while under high centrifugal stress; that is, the coning hinges are subject largely to static loads, with only occasional displacement for slight changes in coning angles. The teetering hinge 21 is not subject to centrifugal loading.

The mechanism also provides for variable coning of the rotor blades 16 and to meet changing flight conditions. This feature is not available with conventional seesaw or teetering hinge rotors.

The slide pole 18 and blade fold-up slide units 149 which telescope over the pole have four sides. Four brake pads are fitted to the four sides of the unit 149 and slide against the pole 18 of like shape. In normal forward rotor flight operation, the right side advancing blade would tend to flap up and the left side retreating blade would flap down. This would put the right blade support arm 17 in compression forcing the brake pad on the right side against that side of the pole 18. The left side downward flapping blade would place the left blade support arm 17 in tension, further pulling the right side brake pad to the right side braking surface of the pole and pulling the left side brake pad away from the pole. For the sake of simplicity in the drawings, the brake pads are not shown. The above action will tend to immobilize the fold-up hinges 22 during normal operation and all blade flapping will be around the center of teetering hinge 21. Only when both blades tend to flap up or down simultaneously, which results in a coning angle change, will there be any relative movement in the fold-up hinge.

The two slide units 149 are joined together by connector 168, as stated, for the purpose of increasing blade torsional rigidity which will aid in preventing blade flutter. The blade body itself is designed for high torsional rigidity, but the support arms 17 being long and slender are more vulnerable to flutter. The blade support arms 17 connect the leading and trailing edges of the opposed blades 16. Torsional movements of an up-flapping blade reverses direction when the blades flap downwardly. This means that in normal blade flapping in forward flight, the torsional moment on one set of support arms 17 connected to the same slide unit 149 will tend to push one side unit up while the other set of support arms 17 connected with the other slide unit will tend to push such slide unit down. That is, torsional moments of opposed blades will tend to push one slide unit up while the other slide unit tends to be pushed downwardly, and the lack of torsional rigidity of the blade support arms 150 would allow it to happen thereby causing blade flutter. By connecting the two slide units together via the connector unit 169, the up and down force on the two slide units will be cancelled out, thereby preventing relative movement between the slide pole 18 and the slide unit 149. By connecting the slide units, the blade support arms 17 assist in preventing blade flutter.

The two split blade hub plates 152 are attached to the tip ends of the rotor head fork 137 by the teeter hinges 21. The head fork is an extension of the rotating part of the rotor mast. The two blade fold-up slide poles 18 are an extension of the two split hub blocks 152 and move or flap with the hub block movements. The blade root arms 150 are attached to the outside of the split hub block 152 at the rotor blade fold-up hing 22 and the split hub plate connector 153 secures the two blade root arms together by joining the two fold-up hinges 22.

A hub block-hub plate separator 154 adds strength to the unit.

Lead-lag blade forces generate in-plane lateral stress on the rotor hub at the blade roots. The teeter hinge cannot absorb these lateral loads because the teeter hinge is a substantial distance above the blade roots. The rotor lateral load bearing roller unit 167 is placed beneath the teeter hinge to absorb this lateral stress.

Four rotor flapping control cylinders 139 act as dampers on rotor flapping. Dampering of the blade flapping can be conttolled from the cockpit and can be progressively increased to completely center and lock the teetering hinge. Locking or restricting movement of the teetering hinge is useful on rotor blade folding and retraction and also on take-off and landing to prevent excessively flapping blades from hitting the fuselage.

FIG. 33 illustrates the arrangement of the cylinders and how they work. A variable speed electric motor 205, controlled from a variable switch 204 in the cockpit, powers a hydraulic pump 206. The retraction and extension ports of each cylinder are connected to their like ports of the opposite cylinder of the pair.

Joined to each of the connecting lines is a hydraulic accumulator 210 and 211 to compensate for variations in fluid requirements above and below the pistons. The pressure line from the hydraulic pump is connected to the common line that contracts the pair of cylinders. A calibrated resistor 209 is in the pressure line that leads back to the hydraulic tank 207. Increasing pressure in the system tends to contract both cylinders. The geometry of the cylinders is such that contracting the cylinder will tend to center the teeter hinge. The reason for this is that when the blade flaps off center the extended cylinder has greater leverage or power on the teeter hinge than the contracted cylinder and, consequently, equal hydraulic pressure on the cylinders will give greater pulling force on the extended cylinder and tend to center the teeter hinge. With any given hydraulic pressure, and further off center the teeter hinge the greater the dampering action of the cylinders. That is, the dampering rate becomes progressively greater the further off center the teeter hinge gets. This is also due to the increasing leverage of a cylinder as the piston extends. The interconnecting line of the extension ports of the pair of cylinders 213 can act as a non-variable damper of rotor flapping. Line 214 is connected to like ports on the opposite pair of cylinders on the other side of the mast.

This system allows for unrestrained coning change while restraining flapping, which is what is desired. The dampering of blade flapping has been found to be beneficial for some types of rotor crafts, and several patents have been taken out on systems to accomplish this dampering, see U.S. Pat. Nos. 2, 595,642 and 2,672,202.

These dampers can be considered both active dampers from energy input via line 212 and passive dampers via fluid transfer via line 213 and can be used to damper critical harmonic frequencies that may cause blade flutter and other problems.

Generally speaking, the larger the rotor craft the greater the need for dampering of blade flapping, and this VTOL aircraft is designed to be quite large. Blade flapping dampering or restriction increases the effectiveness and sensitivity of cyclic control and reduces the stick control lag. The cyclic stick control lag problem increases with the size of the aircraft. Minimum blade flapping restriction would be used on fast foward rotor speed and maximum blade flapping restriction would be useful for tight maneuvering on take-off and landing.

The fixed pitch jet flap cyclic pitch control is presently found to be less effective than the conventional mechanical swash plate cyclic pitch control; consequently, increasing the effectiveness of the jet flap cyclic pitch control may be more important and necessary than increasing the effectiveness of conventional mechanical swash plate cyclic pitch control. One reason why jet flap cyclic pitch control has proven to be somewhat ineffective is that since that angle of the blade jet slot points downward, usually 60° to 70° from the horizontal, this exerts an upward thrust on the rotor. With free-flapping blades cyclic control, increasing the jet flap slot pressure on one side of the rotor forces the blade to flap upward, thereby losing part of the lift the increased jet flap pressure was supposed to create. With blade flapping restrained, a higher proportion of this cyclic jet flap lift differential is preserved. Another reason cyclic jet flaps have proven ineffective is that too small a proportion of jet engine thrust was allocated to the jet flaps.

Note that the rotor system is designed to keep hot exhaust gases away from all structural parts of the rotor system. Cooler by-pass air passages are designed to come between hot exhaust gases and the rotor bearings, rotor seals, rotor brakes, rotor mast structural members, and the rotor blades. This is an important aspect of this invention, as high temperature exposure to heat-sensitive rotor parts has been one of the more difficult problems in hot-cycle pressure jet rotors. Heat energy transfer from hot exhaust gases to by-pass air is partially recovered in higher energy for the by-pass jet flaps.

THE ROTOR BLADE

The rotor blade consists of the following major parts: an outer main one-piece blade 16, an inner one-piece insulated hot gas duct system for rotor thrust 177, a bolt-on blade tip cascade nozzle 151, and a bolt-on blade root end plate 173. The outer main one-piece blade 16 is open at both ends. At the root end are two widely-spaced blade root arms 150 that leave ample unobstructive space for the flexible gas passage ducts 19 and 20. At the end of the blade root arms are the rotor blade fold-up hinges 22. The blade root end cavity (between the blade root arms) is large enough so that the entire one-piece insulated hot gas duct system 177 can be placed in the blade shell as a unit. The hot gas duct system 177 consists of a double bifurcated distributor manifold or "tree" 172 that converts the single duct to four ducts 175. In one major branch of the tree is a one engine out blade thrust cut out valve 170. This, in effect, reduces the blade tip nozzle area by one-half in case of engine failure.

The inner structure of the blade shell 16 consists of solid longitudinal stringers 175. The four prongs of the hot gas duct 177 fit between these longitudinal stringers. Attached to these longitudinal stringers and to top and bottom inside of the blade shell are thrust duct stand-off knobs 176 which position and hold tight the gas ducts and keep the hot ducts from coming into contact with the blade. FIGS. 10 and 16 illustrate the design of this blade system.

The blade root plate 173 is bolted to the root end cavity of the blade. This blade root plate has two duct holes for the hot gas flexible duct 19 and the by-pass flexible duct 20. This blade root plate serves the following functions:

1. Adds structural integrity to the blade and increases torsional rigidity;
2. Acts as an air seal for the by-pass jet flap air; and
3. Acts as a single anchor point for the hot gas jet thrust one-piece duct system and absorbs all centrifugal load of this duct system. The duct system is rigidly attached only at the blade root plate and not at any other part of the blade.

This one point attachment of the hot gas duct system allows the hot duct complete freedom for expansion and contraction without effecting the structural part of the blade. The upstream ends of the tip jet nozzle 151 act as sliding seals 181 that fit over the ends of the four gas ducts 177 to allow for expansion and contraction. The tip jet nozzle, which contains cascade vanes 182 which redirect the thrust 90°, bolt on the end of the rotor blade 16.

The flexible by-pass air duct 20 which is bolted to the blade root plate empties out into the cavity of the blade. Short deflector blades 174 help distribute the air flow within the blade. The blade longitudinal stringers form separate airtight partitions for the by-pass air to travel down. The rotor blade jet flap slot 180 is located on the underside near the trailing edge of the blade. The by-pass air supply to the jet flap slot is divided up, or separated, at various stations along the rotor by the blade by-pass air separators 178. That is, by-pass air in each separate partition is directed to a specific segment of the jet slot by the by-pass air separators 178. Large holes 179 in the partitions, or longitudinal stringers 175 are placed in appropriate places in the partitions or longitudinal stringers 175 in order to allow by-pass air to pass through other partitions to get to the jet flap slots. The by-pass air separators 178 also have other holes in them to allow the hot jet thrust ducts 177 to pass through them. The by-pass air supply is separated in order to control and regulate the air pressure and flow along the various stations of the jet flap slot. Slot widths and air flow requirements vary greatly from the inboard portion of the jet slot to the blade tip portion. By-pass air pressure builds up in the rotor blade due to the centrifugal pumping action of the rotor blade. By separating the by-pass air in airtight partitions, combined with varying the length of the jet slot that each airtight compartment will serve, the air flow and pressure can be varied and regulated for the separate segments of the jet flap slot.

The by-pass air jet flap system also serves as a cooling system for the rotor blade proper in order to prevent high temperature structural damage to the rotor. The temperature of the blade proper 16 can be controlled or optimized by varying the amount of insulation around the hot gas ducts 177. If desired, a controlled amount of heat transfer and, hence, energy transfer, can be transferred from the hot gas exhaust to the by-pass air.

THE ROTOR CONVERSION, RETRACTION AND STOWAGE SYSTEM

In order to convert the aircraft from rotor flight to fixed wing flight, the following procedure is followed:

1. While still flying slowly forward on the rotor, which means the aircraft is being pulled backwards on the rotor, the rotor is collapsed. This is accomplished by closing the thrust reverser diverter door 103 while maintaining jet engine r.p.m. and thrust. This diverts the engine hot gas thrust from the blade tip nozzles to the fixed target thrust reverser/spoiler 32. Maintaining engine thrust is needed to continue supplying by-pass air to the rotor jet flaps. The rotor jet flaps are used, in effect, to increase the blade pitch angle, and high blade pitch angle is necessary to collapse the rotor. The fixed pitch of the rotor blades is set at a low pitch angle (1° to 2°) so that when all power is removed from the rotor it will automatically go into autorotation. Consequently, the jet flaps are necessary to prevent unwanted autorotation aid to collapse the rotor.

It would be possible to collapse the rotor by turning the engine hot gas diverter valve 44 to the straight through position. This would divert the hot gas from the blade tip nozzle to the engine rectangular jet exhaust nozzle 42; however, this would add downward engine thrust to the gravity drop of the aircraft which would result in fast, long drops in altitude and subject passengers and aircraft to high G loads in pulling out of a steep dive. Such a system would not be practical for large, transport passenger aircraft. By diverting the hot gas from rotor tip to the fixed target thrust reverser/spoiler, the hot gas engine thrust acts to retard the aircraft drop rather than increase it. This makes it possible to convert to fixed wing flight with less drop in altitude, slower speed drop, and lower G loading in pulling out of a dive. However, pulling out of a dive at low air speed requires some special low speed lift and control devices, as conventional fixed wing aircraft lift and control surfaces are not sensitive or effective at low air speeds. Note that the fixed target thrust reverser/spoiler 32 can be tilted slightly relative to the longitudinal axis of the fuselage so that on thrust diversion the thrust provides a nose-up moment to the fuselage in addition to retarding the drop of the fuselage. As soon as the rotor blades are collapsed, by-pass air is diverted from the blade jet flaps by closing the diverter valve to fixed surface jet flaps 56. This by-pass air will now go to the fixed wing jet flaps 25, or, by closing the diverter valve for jet elevator flaps 156, to the jet elevator flaps. The by-pass air can be divided in any proportion needed between fixed-wing jet flaps and elevator jet flaps to meet changing flight requirements.

The elevator jet flap is part of the movable elevators so that the angle of the jet flap can be tilted upward or downward (FIG. 12). In the beginning phase of pulling out of the dive, by-pass air is diverted to the jet elevators and the elevators are moved to the full-up position so that the jet elevators also exert a nose-up moment to the fuselage. As the aircraft is pulling out of the dive some by-pass air is shifted to the fixed-wing jet flaps. The fixed-wing jet flaps retard aircraft drop and also increase low speed lift to the aircraft. Near completion of the pull-out of the dive, hot exhaust gas is diverted to the engine rectangular jet exhaust nozzle 42 by turning the engine hot exhaust gas diverter valve 44 for thrust for fixed-wing flight. Note that during rotor flight, as during all this conversion process, the jet ailerons 26 are operable for directional control on rotor flight and lateral control on fixed-wing flight.

The system is designed to maintain relatively high engine r.p.m. at all times during transition. The attempt to change or reduce engine r.p.m. as a method of aiding conversion, such as cutting engine r.p.m. to collaps the rotor, would be unsatisfactory and dangerous. This is a substantial lag between change in engine control and change in engine r.p.m.'s which would make engine r.p.m. change unfit for control purposes.

This system will enable a low speed pull-out before substantial momentum is built up. Relatively constant cabin pressure and the rearward facing of the passenger seats should minimize passenger discomfort on pull-out.

The aircraft is now flying horizontally on winged flight at low speeds, with by-pass air going to fixed surface jet flaps and with the collapsed rotor trailing behind the tail of the aircraft.

A problem that must be dealt with in this VTOL is the substantial shift of weight in the fuselage on extension and retraction of the rotor. The aircraft flying on the wing with the trailing rotor puts substantial added weight to the rear of the aircraft that has to be supported by the tailplane. The jet elevator, in addition to effecting low speed conversion to fixed-wing flight, can be used to support the added tail weight, if needed. However, the opened rotor stowage door 10, in the slip-stream of the aircraft, provides substantial additional lift (nose-down moment) to the tail of the aircraft. Also, the fixed-wing jet flaps 25 shift the cordwise center of lift of the fixed wing rearward to help support the extended rotor weight. Also, part of the blade weight of the collapsed trailing rotor is supported by the slipstream of the aircraft. On rotor retraction, the tilting of the jet elevator flap upward can compensate for the forward shift of the rotor weight to maintain level flight; and/or by-pass air can be concurrently shifted from the jet elevator flap to the fixed-wing jet flap.

The downward folding rotor stowage door moving in the aircraft slipstream would normally impart a nose-down, or tail-up, moment to the aircraft. To neutrailize this down-pitching moment, hydraulic power cylinders 163 are attached to the elevator control cables so that the elevators are forced up by the power cylinders as the rotor stowage door is forced down by the rotor stowage door actuator 110 so that there is zero pitching moment when the rotor stowage door is opened. The control valve for the rotor stowage door actuator 164 and the control valve for the power cylinder for the elevator 165 are side by side in the cockpit, FIG. 7. The valves are powered from a common hydraulic system and the system is designed so equal movement of the valves provides zero pitching moment when the rotor stowage door opens. These valves can be operated independently to adjust for pitching moment as the rotor is extended. Also, the control valve for the elevator hydraulic booster cylinder 165 is designed so that there is no fluid lock when this valve is closed, and the booster cylinder piston is free to move back and forth for normal operation of the elevator. The elevator booster cylinder control valve is also designed so that the normal elevator stick movement can overcome or override (contract or extend) the elevator hydraulic booster cylinder 163. That is, elevator stick movement can be added to, or subtracted from, elevator booster cylinder force. Hydraulic systems that can perform this operation are common and require no further explanation.

The rotor system rolls in and out of the stowage tube on the rotor carriage wheel system 68 which rides on the four tracks 97. The rotor carriage is attached to an endless cable 216 by a rotor carriage arm 215. A reversible motor 219 powers the endless cable system. To retract the collapsed rotor system into the rotor tube, pilot turns motor switch 220 to "in" position.

There is a series of rollers built into the mouth of the stowage tube and on the inside face of the stowage door to absorb shock and guide the rotor blades in the tube.

There are two sets of special kinds of rollers built into the inside face of the rotor stowage door. They are the rear omni-directional stowage door rollers 115 and the forward omni-directional stowage door roller 116. When the aircraft is in level fixed-wing flight and the collapsed rotor is trailing behind the aircraft, the rotor mast is resting on the stowage door on rollers 115 and 116. These pairs of rollers serve two purposes: (1) to cradle the roller mast so as to aid in centering the rotor mast for straight-in retraction into the tube, and (2) to allow the rotor mast to rotate as it is being retracted into the stowage tube. Since the folded blades must be in the cordwise horizontal position to fit in the rotor stowage tube, the blade will have to be rotated. These special rollers, which are really small rollers set crosswise around the circumference of the big roller, allow friction-free rotation of the mast and forward sliding of the mast as it is being pulled into the stowage tube.

These rollers 115 and 116 are designed to work in conjunction with the special system designed to index or position or rotate the rotor so it will fit in the stowage tube. When rotor retraction is started, if the blades are not in the proper stowage position, the rotor blade position arms 125 are forced into contact with the stowage door rotor blade position guide 120. This position guide deflects the arms which rotate the rotor towards the cordwise horizontal position. On further retraction, the position arms 125 are guided up the rotor stowage door actuator arm and blade position guide 111, which completes the rotating alignment of the blades. The position arm 125 then continues to travel up the piston rods of the rotor stowage door actuators 110. At the end of the actuator cylinder barrel is a ramp 221 to let the position arm travel from the piston rod to the top of the actuator cylinder. A rotor position indicator gage 202 in the cockpit is used as an aid in turning or positioning the rotor.

The rotor stowage door actuator system is designed to "give" or to open wider with the weight of the trailing rotor system on the stowage door. The stowage door actuator has attached to it a rotor stowage door position indicator 161 and there is a read-out unit 162 for this indicator in the cockpit. The pilot, by observing the stowage door angle, can tell when the rotor mast is properly lined up, longitudinally, to be retracted, and the pilot can maneuver the aircraft to properly line up the rotor mast for retraction.

THE PILOT'S FLIGHT CONTROL SYSTEM

Takeoff

The pilot and copilot are in their seats 36 in the rotor flight position. The pilot and copilot are facing downward, restrained by their seat belts and shoulder harnesses. Engines are started. On engine start-up, all jet thrust can be in the straight-through position as in winged flight. That is, by-pass air diverter valves 43 and the hot exhaust air diverter valves 44, are in the straight-through position. An alternate start-up system would be to close the hot exhaust valve 44 in the diverted position, open valve 43, and close valve 103 so that all engine thrust goes through the fixed target thrust reverser/spoiler 32. To spin up the rotor the thrust reverser diverter door 103 is closed so engine thrust goes to the blade tip jet nozzle 151. This is equivalent to spinning the rotor at minimum blade pitch anle (1° to 2°). After the rotor is spinning the latch control handle 159 is pulled which releases the rotor latch on static ground rotor mast support yoke 123. This frees the rotor mast from the static ground rotor mast support yoke 31. To increase lift of the rotor to lift aircraft start changing valve 43, the by-pass air diverter valve to the diverting position. This valve is, in effect, the collective pitch control and sends by-pass air to the rotor blade jet flap slots 180 of the jet flap rotor. This has the effect of increasing the rotor blade pitch angle.

As the rotor lifts the tail of the aircraft, the rotor mast 33 separates from and becomes free of the static ground rotor mast support yoke 31; the fuselage shifts from a substantially horizontal to a substantially vertical position, and the pilot's and copilot's seats are not in upright position, with the pilot and copilot looking through rotor flight windows 12. In the transition, when the fuselage shifts from horizontal to vertical position, the 90° angle in the rotor straightens out via the main floating rotor pitch axis bearing 100 so that the rotor mast becomes substantially straight. When the aircraft clears the ground, it is put in forward flight position. Forward flight on the rotor is assumed to be when the bottom, or underside, of the aircraft is facing into the wind in the direction of travel.

Conversion to and From Rotor Flight

In preparation for conversion from rotor flight to fixed-wing flight, one of the two pilots swivels his seat 180° on the seat swivel axis 185 so that he is facing rearward (from rotor flight direction). This swivel axis 185 may or may not be power actuated. Then the pilot tilts his seat forward approximately 90° by extending seat lowering actuator 184 and adjusts the seat tilting actuator 183. The control switches for these seat control actuators should be conveniently located on the seat, preferably at the seat arm. One pilot is now at the fixed-wing flight controls, facing downward, supported by his seat belt and shoulder harness. The other pilot is at the rotor flight controls flying the aircraft on the rotor in preparation to conversion. Some controls, such as engine controls and some rotor controls, are duplicated at both rotor flight controls and at the fixed-wing flight control compartments. During conversion, the pilot at the fixed-wing controls takes over some functions and pulls the aircraft out of the dive. After the aircraft is on fixed-wing level flight, the pilot at the rotor flight control compartment also tilts his seat upward by extending the seat lowering actuator 184, then swivels his seat 180° on the seat swivel axis 185, and then adjusts the seat tilting actuator 183. To reconvert from fixed-wing flight to rotor flight the process is reversed. During conversion, one pilot is always at the fixed-wing flight control compartment while the other pilot is at the rotor flight control compartment.

To initiate conversion to rotor flight the pilot first shifts the by-pass air to the fixed-wing jet flap by changing the by-pass air diverter valve 43 to the diverter position while the diverter valve to fixed surface jet flaps 56 valve is closed, and the jet elevator flaps 156 valve is open. This slows the aircraft while maintaining altitude. Then the rotor stowage door is opened. The system is designed so that as the rotor stowage door is opened downwardly (giving a nose-down pitching movment) the elevators are pushed upwardly (gving a nose-up pitching moment) so that the combination provides a zero pitching moment air brake to the aircraft, further slowing the aircraft. The aircraft is put into a shallow dive as the rotor is extended. The weight of the rotor shifts rearward, and the elevator is shifted progressively downward to support the rearward weight. Also, by-pass air can be shifted from the fixed-wing jet flaps to the elevator jet flaps to help the tail plane support the rotor weight.

When the rotor is fully extended, hot jet exhaust thrust is diverted to the blade tip nozzles, which start the rotor spinning. The centrifugal force of the spinning rotor unfolds the rotor blade, which further brakes the speed of the aircraft, and the aircraft goes into a steeper dive. When the rotor blades are fully unfolded, by-pass air is diverted from the fixed surface jet flaps to the rotor jet flaps by opening the diverter valve to fixed surface jet flaps 56. The aircraft is now flying on its rotor.

Landing

To land, the aircraft is lowered until the shock absorbing nose 5 touches the ground. When the nose touches, collective pitch is reduced and the rotor is tilted forwardly to "lay-down" the aircraft from the vertical to the horizontal position. As the aircraft fuselage is "laid-down" to the near horizontal position, the rotor almost jack-knives or bends about 90° at the main floating rotor pitch axis bearing 100. As the fuselage tilts relative to the rotor mast, the rotor mast is guided into the prongs of the static ground rotor mast support yoke 31. When the rotor mast is completely within the prongs of the yoke, the rotor latch 123 is released by the latch control handle 159, and the rotor latch engages the rotor latch catch 124. The rotor mast is now secured in the upright position and the engines are cut.

The rotor stowage door acts as the tail landing gear of the aircraft. The weight of the rotor unit is transferred to the stowage door by the rotor load transfer to stowage door stand 119 which engages the rotor load transfer to stowage door pillow block 118. This rotor weight transfer system takes the stress off the stowage door hinges and the tail of the aircraft, which are not designed to support the static, or ground, weight of the rotor.

Emergency Procedures

In case of one engine failing, the aircraft is designed to continue satisfactory operation on rotor flight, or on fixed-wing flight, on either engine. In the case of both engines failure on rotor flight, the rotor (which is set at a low angle of attack) will automatically go into autorotation to provide for slow descent to earth. Short periods of emergency thrust are, or can be provided for rotor blade tip thrust or rotor jet flaps to prolong lift and guide aircraft to a safe landing spot (see element 49, FIG. 6). In case of both engines failure while on winged flight, the emergency thrust can be diverted to the blade tip nozzle to spin-up or deploy the rotor to the point where it will go into autorotation.

The aircraft is designed only for vertical take-off and landings for normal operations but can be landed as a fixed-wing aircraft on its skids in case of emergency. Such emergencies would include rotor failure during rotor flight, or inability to depoly or spin up the stowed rotor. In case of rotor failure during flight, the rotor could be designed to be easily jettisoned if necessary.

HOW THE ROTOR MAST, HUB BLADE AND CONTROL SYSTEM INTERACT TO MEET THE ROTOR FLIGHT REQUIREMENTS OF THIS VTOL AND ALSO FACILITATE THE FOLDING AND STOWAGE OF THE ROTOR

Efficient folding and stowage of this rotor requires a two blade rotor that folds upward on hinges. The opposed blades should be lined up so that the 50 per cent cord line of the opposed blades intersect each other and also intersect the rotor axis. There are several inter-related features that may make this type of rotor feasible. These features include:

1. A free floating flexible mast with the flexible joints a substantial distance beneath the rotor hub (i.e., a long neck mast).
2. The use of jet flaps for cyclic and collective control, and the consequent elimination of the pitch change axis and mechanism.
3. The use of a center teetering hinge with variable coning fold-up blade hinges.
4. An aircraft with the aircraft c.g. far below the rotor.

In conventional single rotor helicopters the distance between the rotor hub and c.g. of the aircraft is approximately 15 percent of the fuselage length. In this VTOL the distance between the rotor hub and the aircraft c.g. is approximately 60 percent of fuselage length, approximately four times greater distance. This factor along with the free-floating hub eliminates all problems relating to center of gravity range during rotor flight. The aircraft c.g. will automatically line up beneath the rotor axis and will tend to give the aircraft a pendulum-like stability on rotor flight.

This low c.g. makes it possible to use a flexible or floating mast, and it also eliminates the need for an offset flapping hinge (T-effect hinge) which would normally be required in conventional single-rotor helicopters to provide for the desired c.g. range or c.g. variation in the fuselage.

This, in turn, makes it feasible to use the underslung center teetering hinge rotor which in turn helps make it feasible to use the two bladed rotor and also makes it feasible to eliminate the need for drag hinges and drag dampers by eliminating the Hooke's joint effect and some other two rev. vibrations when used in conjunction with the free-floating flexible mast.

The free-floating flexible mast acts as an energy sink to absorb two rev. vibrations and also acts to reduce the basic cause of two rev. vibrations by allowing the true rotor axis (which can tilt because of its free-floating nature) to stay more nearly in the same plane with the virtual axis of the rotor. The underslinging of the teetering hinge rotor also aids in keeping the rotor disc c.g. lined up in the same plane with the real rotor axis.

The use of the pressure jet flaps also makes the two bladed rotor more feasible. The jet flap can double rotor blade lift and, therefore, cut required rotor blade area in half (i.e., reduce solidity requirement). Therefore, a two bladed rotor with jet flaps can meet the equivalent requirements of a four bladed rotor without jet flaps.

Now, the use of the jet flap and the use of an airfoil designed for the jet flap can be designed to place the average cordwise center of lift somewhere near the 50 percent cord line instead of near the 25 percent or quarter cord line as on most conventional rotors. This 50 percent cordwise center of lift would more nearly coincide with the natural cordwise center of gravity of the blade and eliminate the necessity of adding leading edge weights as would be required in conventional quarter-cord center of lift rotors. This 50 percent cordwise center of gravity and center of lift rotor make it feasible to attach opposed rotor blades to the hub with no offset so that the 50 percent cord line of opposed blades line up with each other and also intersect the center of the rotor axis. This reduces the combined blade fold-up width by 50 percent (compared with conventional two bladed rotors lined up on their quarter cord lines) and consequently reduces rotor blade width stowage requirements by 50 percent, a most important consideration.

The use of jet flaps can be used for both cyclic and collective pitch control. This allows the use of a fixed pitch rotor. This elimination of the need for pitch horns, pitch change bearings, all linkages, the swash plate, and the necessary mechanical complexity of connecting and disconnecting these linkages when rotor is retracted and extended.

The use of the fixed pitch rotor will permit the use of a two point, strong, widely spaced, zero play attachment at the root of the rotor blade to the rotor hub. This provides a torsionally stiff attachment of the rotor blade, and the rotor blade proper can be designed for high torsional stiffness due to the high thickness-to-cord ratio of the blade requirement of pressure jet rotors. The torsionally stiff blade is highly important because variations in the jet flap pressure and lift (for cyclic and collective control) will shift the cordwise center of lift relative to the fixed cordwise center of gravity which would induce a torsional blade moment which could cause serious blade flutter problems without the torsionally stiff blades.

Also, the shift in the cordwise center of lift due to jet flaps would cause serious pitch change control problems (due to the twisting moment on the blades) if there were any pitch change mechanism, which there is not.

For a blade to be designed with torsional stiffness, it must have longitudinal stiffness. A conventional teetering hinge rotor would normally need longitudinal flexibility to compensate for its fixed coning angle in order that the blade can flex up or down to modify the fixed cone to adjust to the varying load and r.p.m. of the rotor. However, this is not a conventional teetering hinge rotor in that it has blade fold-up hinges which provide for an automatic adjustment of coning requirements; consequently, the blade can be made longitudinally very stiff as well as laterally stiff (in-plane lead-lag stiffness) and torsionally stiff. This greatly reduces blade resonant vibration problems which would normally be a very big problem with the extra long blades required when only two blades are used, as is necessary in this rotor system.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A vertical take-off and landing aircraft comprising a fixed wing aircraft body portion having a pair of jet propulsion engines and a rear opening longitudinal fuselage rotor stowage compartment, a take-off and landing rotor for the aircraft adapted when deployed outside of said stowage compartment to lift the aircraft tail upwardly with the nose of the craft downwardly, a carriage means for said rotor having tracked engagement with said stowage compartment, power traction means connected with said carriage means to move the carriage means in opposite directions in the stowage compartment for retracting and deploying the rotor, said rotor comprising a mast including rotating and non-rotating parts, means forming a universal type mechanical connection between the carriage means and non-rotating part of the mast, a pair of lifting rotor blades having jet nozzle means at their tips and jet flap slots near longitudinal edges thereof, mechanical linkage means pivotally connecting said blades to the rotating part of said mast in such a manner that the blades may fold upwardly into substantial parallelism to facilitate retraction thereof into said stowage compartment, valved conduit means for diverting exhaust gas from said jet engines and delivering the same through said mast and rotor blades to said tip jet nozzle means to produce rotation of said blades, and additional valved conduit means for diverting by-pass air from said jet engines and delivering it cyclically and variably through said mast and blades to said jet flap slots, said valved conduit means for diverting exhaust gas comprising a duct connected in the exhaust jet nozzle of each engine and leading to and joined with a common center exhaust gas duct in the after portion of the aircraft fuselage, a coacting common exhaust gas duct on the carriage means and movable therewith, and means forming a sliding seal between opposing ends of said common ducts whereby exhaust gas may pass from one into the other without leakage when the common ducts are in registry.

2. The structure of claim 1, and a flexible duct section for exhaust gas interconnecting said non-rotating rotor mast part and said common exhaust gas duct of the carriage means.

3. The structure of claim 1, and said aircraft body portion having a floor partition and rear facing passenger seats in the fuselage above the rotor stowage compartment.

4. The structure of claim 3, and a cockpit in the nose portion of the fuselage including seats and aircraft controls for a first pilot who pilots the aircraft during normal fixed wing flight and for a second pilot who pilots the aircraft during rotor flight while the fuselage is substantially vertical and nose down.

5. The structure of claim 4, and a shock-absorbing nose structure on the fuselage to facilitate landing the aircraft nose downwardly into contact with the ground.

6. The structure of claim 4, and said cockpit having windows for the two pilots on the top and bottom of the aircraft nose, the seat for the rotor flight pilot facing downwardly and rearwardly adjacent the windows on the bottom of the nose.

7. The structure of claim 1, and a door hingedly secured to the rear of the fuselage and serving in one position to cover the rear open end of said rotor stowage compartment and serving in a second position as a ground support for the aft end of the fuselage, and guidance means for folded rotor blades on said door operable in the open position of the door to assist in guiding the rotor into the stowage compartment.

8. The structure of claim 7, and a shock-absorbing means on the rotor stowage door adapted to contact the ground at the completion of landing of the aircraft.

9. The structure of claim 5, and means to guide and lock into place in an upright position the mast structure of said rotor on landing of the aircraft when the fuselage thereof moves to a substantially horizontal position and the rotor is stopped.

10. The structure of claim 7, and a power actuator for said door mounted in said fuselage.

11. The structure of claim 1, and means to automatically rotate the rotor on its axis with the rotor blades folded so as to properly align the folded blades for proper entry lengthwise into said stowage compartment.

12. The structure of claim 1, and a center located fixed target thrust spoiler near the aft portion of the fuselage, and a coacting power-operated thrust reverser door adjacent the thrust spoiler, whereby the exhaust gas from both aircraft engines may be directed to the thrust spoiler.

13. The structure of claim 12, and said thrust spoiler being tiltable to assist in maneuvering the aircraft out of a dive at low speed for rapid conversion from rotor flight to fixed wing flight.

14. The structure of claim 1, and linkage means interconnecting the rotating part of said mast and said blades to stabilize the blades and to control and limit flapping thereof, said linkage means including a pair of fluid pressure activated cylinder units which control and dampen the flapping action of said blades.

15. The structure of claim 1, and each lifting rotor blade having an internal exhaust gas distribution system directing exhaust gas to said blade tip jet nozzle means, and each blade having an internal chamber and guidance means directing by-pass air to said blade jet flap slots.

16. A vertical take-off and landing aircraft comprising a fixed wing aircraft body portion having a pair of jet propulsion engines and a rear opening longitudinal fuselage rotor stowage compartment, a take-off and landing rotor for the aircraft adapted when deployed outside of said stowage compartment to lift the aircraft tail upwardly with its nose downwardly, a carriage means for said rotor having tracked engagement with said stowage compartment, power traction means connected with said carriage means to move the carriage means in opposite directions in the stowage compartment for retracting and deploying the rotor, said rotor comprising a mast including rotating and non-rotating parts, means forming a universal type mechanical connection between the carriage means and non-rotating part of the mast, a pair of lifting rotor blades having jet nozzle means at their tips and jet flap slots near longitudinal edges thereof, mechanical linkage means pivotally connecting said blades to the rotating part of said mast in such a manner that the blades may fold upwardly into substantial parallelism to facilitate retraction thereof into said stowage compartment, valved conduit means for diverting exhaust gas from said jet engines and delivering the same through said mast and rotor blades to said tip jet nozzle means to produce rotation of said blades, additional valved conduit means for diverting by-pass air from said jet engines and delivering it cyclically and variably through said mast and blades to said jet flap slots, said additional valved conduit means diverting by-pass air from said jet engines comprising a by-pass air duct connected in the by-pass air channel of each jet engine and leading to and connected in a common by-pass air duct in the after portion of the fuselage and near the center thereof, said common by-pass air duct being divided into two valved branches and said two branches being sub-divided into four duct branches, a like number of by-pass air duct branches on the carriage means and movable therewith, and means forming a sliding seal between the opposed mouths of said four duct branches on the fuselage and coacting branches on the carriage means.

17. The structure of claim 16, and plural flexible duct sections for by-pass air interconnecting said duct branches on the carriage means with variable by-pass air passages of the rotor mast.

18. The structure of claim 17, and additional flexible duct sections connected with the rotating part of the mast and the interior of said rotor blades and placing the jet flap slots of the rotor blades in communication with said variable passages of the rotor mast.

19. The structure of claim 18, and said variable by-pass air passages of the rotor mast including relatively stationary quadrant passages in the non-rotating part of said mast, and a pair of divided by-pass air passages in the rotating part of the mast and being circumferentially coextensive with the non-rotating quadrant passages and movable relative thereto circumferentially to cylically vary the movement of by-pass air to said rotor blade jet flap slots.

20. A vertical take-off and landing aircraft comprising a fixed wing aircraft body portion having a pair of jet propulsion engines on opposite sides of the aircraft fuselage, said fuselage having a longitudinal rear opening rotor stowage compartment, a lifting rotor for the aircraft adapted to be deployed through the rear of the stowage compartment and raising and lowering the aircraft in a nose down vertical attitude for take-off and landing, mechanical power means connected with the rotor to retract the same into the stowage compartment and to move the rotor rearwardly therefrom, said rotor including a pair of hinged foldable airfoil blades having jet nozzles thereon to produce rotation of the rotor and having jet flap slots by means of which the pitch of the blades and the directional attitude of the rotor may be regulated, fixed conduit means on the aircraft body portion connected with said jet propulsion engines for diverting exhaust gas and by-pass air therefrom for delivery to the rotor, coacting conduit means movable with the rotor into selaed registration with the fixed conduit means when the rotor is deployed, and passage means on the rotor and within the blades thereof for delivering engine exhaust gas to said blade jet nozzles and for cyclically and variably delivering by-pass air from the engines to said blade jet flap slots.

21. The structure of claim 20, and adjustable valving means in the fixed conduit means for regulating the volumetric flow of exhaust gas and by-pass air diverted from said engines to the rotor.

22. The structure of claim 20, and a mast structure for said lifting rotor including rotating and non-rotating interfitting components, said components having divided exhaust gas passage means and divided relatively movable variable passage means for by-pass air, and said last-named exhaust gas and by-pass air passage means of the mast structure communicating with said coacting movable conduit means.

23. A vertical take-off and landing aircraft comprising a fixed wing aircraft body portion having a pair of jet propulsion engines and a rear opening longitudinal fuselage rotor stowage compartment, a take-off and landing rotor for the aircraft adapted when deployed outside of said stowage compartment to lift the aircraft tail upwardly with the nose of the craft downwardly, a carriage means for said rotor having tracked engagement with said stowage compartment, power traction means connected with said carriage means to move the carriage means in opposite directions in the stowage compartment for retracting and deploying the rotor, said rotor comprising a mast including rotating and non-rotating parts, means forming a universal type mechanical connection between the carriage means and non-rotating part of the mast, a pair of lifting rotor blades having jet nozzle means at their tips and jet flap slots near longitudinal edges thereof, mechanical linkage means pivotally connecting said blades to the rotating part of said mast in such a manner that the blades may fold upwardly into substantial parallelism to facilitate retraction thereof into said stowage compartment, valved conduit means for diverting exhaust gas from said jet engines and delivering the same through said mast and rotor blades to said tip jet nozzle means to produce rotation of said blades, additional valved conduit means for diverting by-pass air from said jet engines and delivering it cyclically and variably through said mast and blades to said jet flap slots, and additional by-pass air duct means for delivering by-pass air to fixed wing jet flaps and elevator jet flaps on the aircraft.

24. A vertical take-off and landing aircraft comprising a fixed wing aircraft body portion having a pair of jet propulsion engines and a rear opening longitudinal fuselage rotor stowage compartment, a take-off and landing rotor for the aircraft adapted when deployed outside of said stowage compartment to lift the aircraft tail upwardly with the nose of the craft downwardly, a carriage means for said rotor having tracked engagement with said stowage compartment, power traction means connected with said carriage means to move the carriage means in opposite directions in the stowage compartment for retracting and deploying the rotor, said rotor comprising a mast including rotating and non-rotating parts, means forming a universal type mechanical connection between the carriage means and non-rotating part of the mast, a pair of lifting rotor blades having jet nozzle means at their tips and jet flap slots near longitudinal edges thereof, mechanical linkage means pivotally connecting said blades to the rotating part of said mast in such a manner that the blades may fold upwardly into substantial parallelism to facilitate retraction thereof into said stowage compartment, valved conduit means for diverting exhaust gas from said jet engines and delivering the same through said mast and rotor blades to said tip jet nozzle means to produce rotation of said blades, additional valved conduit means for diverting by-pass air from said jet engines and delivering it cyclically and variably through said mast and blades to said jet flap slots, and automatic valve means in said valved conduit means for diverting exhaust gas and in said additional valved conduit means for diverting by-pass air and being automatically operable in response to failure of either aircraft engine to assure a continued adequate flow of exhaust gas and by-pass air to said rotor.

25. The structure of claim 24, and said automatic valve means consisting of a pair of independently pivoted flip-flop valve plate elements in said conduit means and additional conduit means and being automatically self-centering in the presence of exhaust gas and by-pass air streams from both of said engines.

26. A vertical take-off and landing aircraft having a tail lifting take-off and landing rotor and fixed wing means for normal flight, a pair of laterally spaced jet engines on the aircraft including exhaust gas and by-pass air passage means, said rotor having a pair of airfoil blades containing jet flap slots for regulating blade pitch and also having blade tip jet nozzles for producing rotation of the rotor, and a jet flap cyclic control system for the rotor which includes a bifurcated duct for by-pass air diverted from the by-pass air passage means of said engines, a valve immediately upstream from said bifurcated duct enabling by-pass air to be directed into either branch of the bifurcated duct, another valve arranged in each branch of the bifurcated duct and having common control means, an additional pair of sub-branch ducts leading from each said branch of the bifurcated duct, said sub-branches being downstream from said valves in said branches having the common control means, whereby the volume of by-pass air to any of the sub-branch ducts can be varied, a rotor mast structure intervened between said sub-branch ducts and blade jet flap slots and containing a circumferential passage for by-pass air divided into four quadrants which are non-rotating, said mast structure having a mating interfitting circumferential passage for by-pass air which is divided into a pair of semi-circular segments and which rotates, said quadrants and semi-circular segments communicating to achieve cyclic variation in the volume of by-pass air being delivered to the blade jet flap slots, another pair of ducts interconnecting said semi-circular segments with an interior chamber of each rotor blade leading to the jet flap slot of the blade, and valved conduit means between the aircraft engines and interior passage means of said blades for delivering engine exhaust gas to said blade tip jet nozzles.

27. The structure of claim 26, and said valved conduit means for delivering said exhaust gas including a passage for exhaust gas in the rotating part of the mast structure and inwardly of said quadrants, said passage being internally divided into two sections each delivering exhaust gas to the tip jet nozzle of one rotor blade.

28. The structure of claim 26, and a blade root arm for each rotor blade, a pair of hinge supports for said root arms to allow upward folding of the blades and varying of the blade coning angle, said hinge supports carried by the rotating part of the rotor mast structure, means forming a single teetering hinge above said hinge supports, blade fold-up slide pole means extending above the teetering hinge, slide units movably mounted on the slide pole means, and a pair of widely spaced blade support arms connected to each blade near the leading and trailing edges thereof, said arms also connected with said slide units.

29. The structure of claim 26, and each of said airfoil blades of the rotor comprising a hollow blade body, an insulated unitary exhaust gas duct system slidable as a unit into the blade body, a bolt-on blade tip cascade nozzle structure for the blade body communicating with said duct system, and a bolt-on blade root end plate for the blade body serving to anchor said duct system and adding structural integrity and rigidity to the blade.

30. The structure of claim 29, and a slip-type expansion joint between said dut system and blade tip cascade nozzle structure.

31. The structure of claim 26, and said first and second named valves comprising butterfly-type valves having off-center pivots and being self-centering in the slipstream in which they are disposed in the absence of a positive controlling force thereon.

* * * * *